US010212971B2

(12) United States Patent
Cameron et al.

(10) Patent No.: US 10,212,971 B2
(45) Date of Patent: Feb. 26, 2019

(54) ELECTRONIC VAPORIZING DEVICE WITH POWER CONTROL FOR PROVISIONING OF POWER TO AN AUXILIARY ELECTRONIC DEVICE

(71) Applicant: LunaTech, LLC, Encino, CA (US)

(72) Inventors: John David Cameron, Encino, CA (US); Dean Becker, Fairhope, AL (US); Gene Fein, Oxnard, CA (US)

(73) Assignee: LunaTech, LLC, Encino, CA (US)

( * ) Notice: Subject to any disclaimer, the term of this patent is extended or adjusted under 35 U.S.C. 154(b) by 49 days.

(21) Appl. No.: 15/494,047

(22) Filed: Apr. 21, 2017

(65) Prior Publication Data

US 2017/0303591 A1    Oct. 26, 2017

Related U.S. Application Data

(60) Provisional application No. 62/327,111, filed on Apr. 25, 2016.

(51) Int. Cl.
*A24F 11/00* (2006.01)
*A24F 47/00* (2006.01)
*H05B 1/02* (2006.01)
*H02J 7/00* (2006.01)
*H02J 7/02* (2016.01)

(52) U.S. Cl.
CPC .......... *A24F 47/008* (2013.01); *H02J 7/0054* (2013.01); *H02J 7/0068* (2013.01); *H05B 1/0244* (2013.01); *H02J 7/0045* (2013.01); *H02J 7/025* (2013.01); *H02J 2007/0062* (2013.01); *H05B 2203/021* (2013.01)

(58) Field of Classification Search
CPC ............................ A24F 47/008; A24F 47/002
USPC .................................................. 131/328, 329
See application file for complete search history.

(56) References Cited

U.S. PATENT DOCUMENTS

| 8,757,147 | B2 | 6/2014 | Terry et al. |
| 8,820,330 | B2 | 9/2014 | Bellinger |
| 8,851,083 | B2 | 10/2014 | Oglesby et al. |
| 8,955,522 | B1 | 2/2015 | Bowen et al. |
| 9,408,416 | B2 | 8/2016 | Monsees et al. |
| 9,413,181 | B2 | 8/2016 | Ford |
| 9,498,002 | B1 | 11/2016 | Soreide |
| 9,585,981 | B2 | 3/2017 | Wynalda, Jr. |
| 2015/0027466 | A1* | 1/2015 | Xiang .................. H02J 7/0013 131/329 |
| 2015/0075546 | A1* | 3/2015 | Kueny, Sr. ............ A24F 47/008 131/329 |
| 2015/0080053 | A1* | 3/2015 | Ciccarello ............... H04M 1/21 455/557 |

(Continued)

*Primary Examiner* — Hae Moon Hyeon
(74) *Attorney, Agent, or Firm* — Hankin Patent Law, APC; Susan L. McCain; Anooj Patel

(57) ABSTRACT

An electronic vaporizing device comprising at least one power source for power generation for operation of the device, wherein at least a portion of the power generated thereby may be provided to at least one other electronic device that may be connected or associated with the electronic vaporizing device. The electronic vaporizing device may include a power output control component that regulates the power provided to the vaporizing device and to the at least one other electronic device. A method is also provided for the provisioning of power generated by a power source of an electronic vaporizing device.

20 Claims, 14 Drawing Sheets

(56) References Cited

U.S. PATENT DOCUMENTS

| | | | |
|---|---|---|---|
| 2015/0136158 A1* | 5/2015 | Stevens ................. | A24F 47/008 |
| | | | 131/329 |
| 2015/0327596 A1* | 11/2015 | Alarcon ................ | A24F 47/008 |
| | | | 131/328 |
| 2017/0258136 A1* | 9/2017 | Hawes ................. | H04W 76/10 |
| 2018/0168237 A1* | 6/2018 | Krietzman ............ | A24F 47/008 |

* cited by examiner

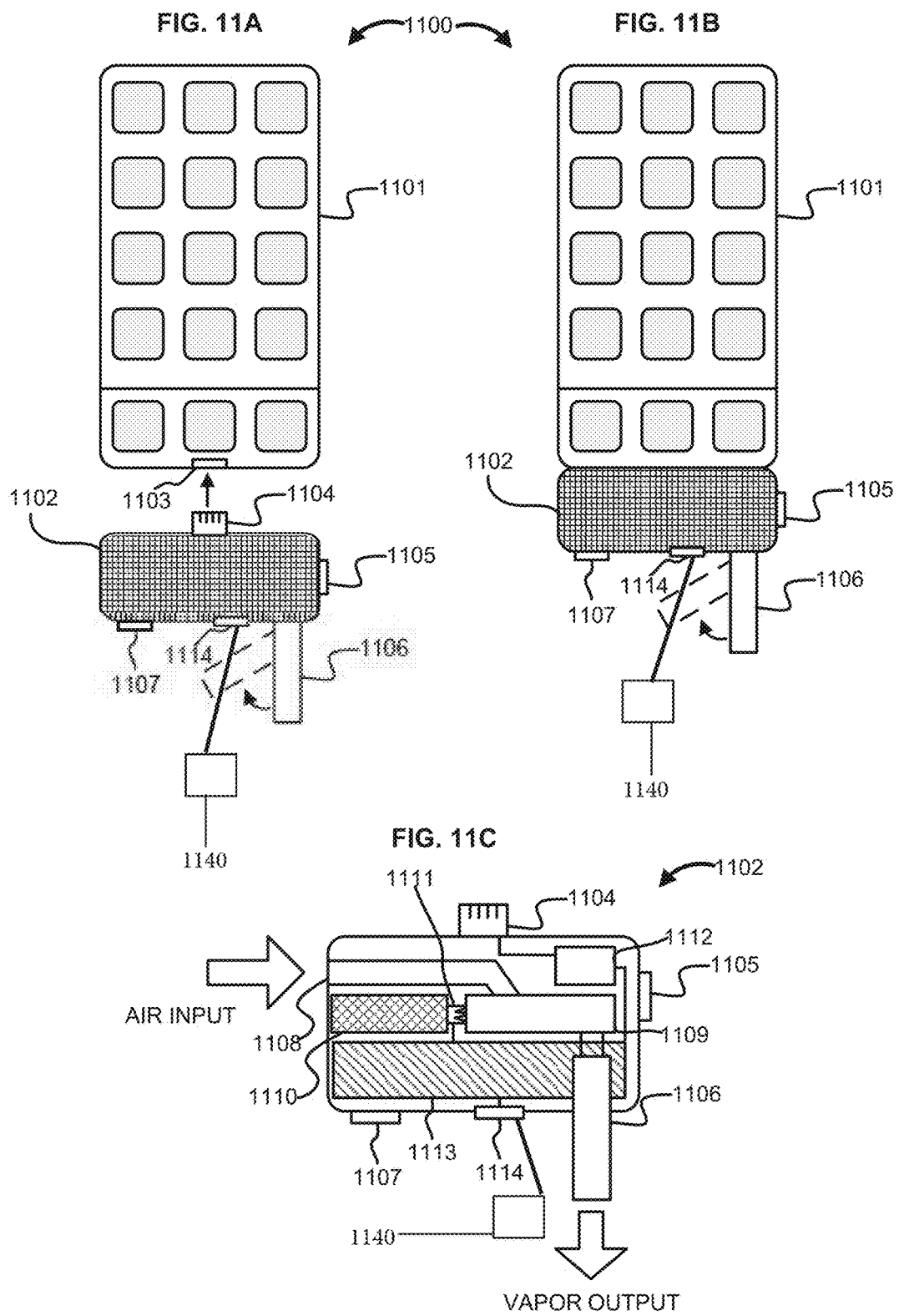

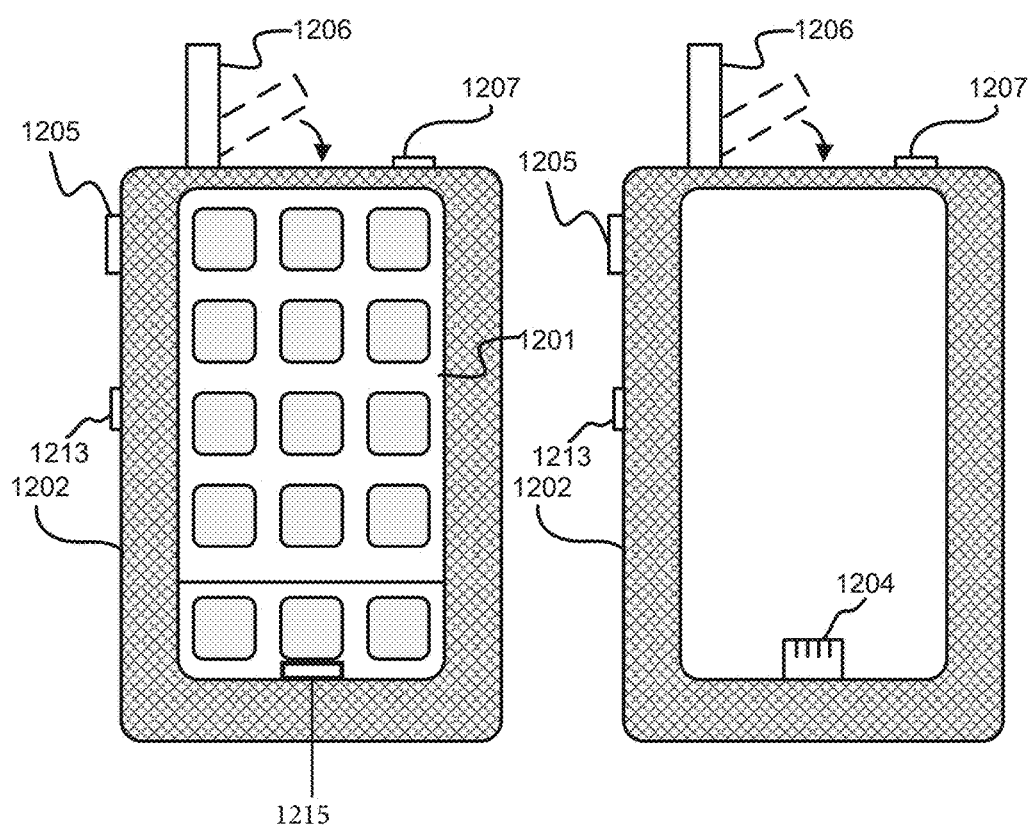
FIG. 12A                    FIG. 12B

ELECTRONIC VAPORIZING DEVICE WITH POWER CONTROL FOR PROVISIONING OF POWER TO AN AUXILIARY ELECTRONIC DEVICE

CROSS-REFERENCE TO RELATED APPLICATION

This application claims the benefit of U.S. Provisional Application No. 62/327,111 filed on Apr. 25, 2016, entitled "Electronic Vapor Device with Auxiliary Power Source", the contents of which are incorporated herein by reference as though set forth in their entirety.

BACKGROUND

Consumers utilize electronic vapor cigarettes, pipes, and modified vapor devices to enjoy what is commonly known as "vaping." Vaping is an increasingly popular market segment, which has been steadily gaining market share over the last several years, and continues to do so. In general, currently available vaporizers are characterized by heating a solid to a smoldering point, vaporizing a liquid by direct or indirect heat, or nebulizing a liquid by heat and/or by expansion through a nozzle. Such devices are designed to release aromatic materials held in a solid or liquid form, while avoiding high temperatures that may result in combustion and associated formation of tars, carbon monoxide, or other harmful combustion byproducts. Consumers often carry both an electronic device (e.g., a cellular phone) and a vapor device, causing the consumer to have to manage multiple devices throughout the day. It would be desirable, therefore, to develop new technologies for enabling the vapor device carried by users to provide a power source for the electronic device.

SUMMARY

The following presents a simplified overview of the example embodiments in order to provide a basic understanding of some embodiments of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented hereinbelow. It is to be understood that both the following general description and the following detailed description are exemplary and explanatory only and are not restrictive.

In accordance with the embodiments disclosed herein, the present disclosure is directed to an electronic vaporizing device with power control for provisioning power generated by the vaporizing device to at least one auxiliary electronic device connected to the vaporizing device. In one embodiment, there is provided a system, method, and device deployment of an electronic vaporizing hybrid device that comprises an electronic vaping system, wherein the electronic vaporizing device's power source may be utilized to power at least one of the electronic vaporizing hybrid device and/or a companion electronic device.

Another embodiment may be a method comprising connecting at least one electronic device to a detachable vaporizer via a power output port, receiving a command to activate the power output port, drawing power from a power source within the detachable vaporizer, wherein the power source is coupled to the power output port, and providing the power to the at least one electronic device via the power output port.

Another embodiment may be a detachable vaporizer comprising a power source, a power output port coupled to the power source, an air intake, a vapor output, a container for storing a vaporizable material, and a mixing chamber coupled to the air intake for receiving air, the container for receiving the vaporizable material, and a heating element, coupled to the power source, configured for heating the vaporizable material and the received air to generate a heated vapor.

In various implementations, the electronic vaporizing device may comprise at least one power source for power generation for operation of the device, wherein at least a portion of the power generated thereby may be provided to at least one other electronic device connected or associated with the electronic vaporizing device. The electronic vaporizing device may comprise a power output control component that regulates the power provided to the vaporizing device and/or to the power provided to the at least one other electronic device. The provisioning of power between the vaporizing device and an electronic device connected thereto is preferably determined in accordance with power provision parameters. Such parameters may be determined based on the operational parameters of the vaporizing device, the electronic device, the power source, environmental conditions, and the like. The parameters may also be determined based in whole or in part on input received from an associated user of the electronic vaporizing device.

In accordance with the embodiments disclosed herein, the present disclosure may comprise an electronic vaporizing device. The electronic vaporizing device may comprise a processor operable for controlling the electronic vaporizing device, at least one container configured to store vaporizable material, a vaporizing component operatively coupled to the processor and controlled in part by the processor. Preferably, the vaporizing component may be in fluid communication with the at least one container for receiving at least a portion of the vaporizable material therefrom, wherein the vaporizing component is preferably operable to vaporize materials received therein. The electronic vaporizing device may further comprise at least one vapor outlet coupled to the vaporizing component and configured to receive vapor generated by vaporizing component, the at least one vapor outlet may be operable to expel the generated vapor from the vaporizing device. The electronic vaporizing device may further comprise at least one power source operatively coupled to the vaporizing component, wherein the at least one power source may be operable to generate a supply of power for at least the operation of the vaporizing component, and at least one power output port may be operatively coupled to the at least one power source and configured to connect to at least one auxiliary electronic device, wherein the at least one power output port may be operable to provide at least a portion of the generated supply of power by the at least one power source to the at least one auxiliary electronic device. A power output control component is operatively coupled to the processor and controlled in part by the processor, wherein the power output control component is operatively coupled to the at least one power source and operable to regulate the generated supply of power provided to the vaporizing component and at least one auxiliary electronic device connected to the power outlet port.

In one embodiment, the power output control component may be operable to regulate the generated supply of power provided to the vaporizing component and at least one auxiliary electronic device connected to the at least one power outlet port such that the power provided to the vaporizing component and the at least one auxiliary electronic device is in accordance with at least one power provision parameter.

In a preferred embodiment, the processor may be operable to obtain data associated with at least one operational parameter of the vaporizing component, at least one operational parameter of the at least one auxiliary electronic device, at least one power generation parameter of the at least one power source, at least one connection parameter of a connection of the at least one auxiliary electronic device to the at least one power outlet port, at least one preference parameter for the provision of available power to be provided to the vaporizing component and the at least one auxiliary electronic device, and combinations thereof, and may determine, in response to at least a portion of the obtained data, at least one power provision parameter for the power output control component. The processor may also be operable to configure the at least one power provision parameter of the power output control component, and regulate the generated supply of power provided to the vaporizing component and the at least one auxiliary electronic device in accordance with the at least one power provision parameter. The electronic vaporizing device may further comprise an input/output interface operatively coupled to the processor, and wherein the processor is further operable to receive power provision parameter data from an associated user via the at least one input/output interface.

In one embodiment, the electronic vaporizing device may comprise at least one vaporizing component power source configured to generate a supply of power for the operation of the vaporizing component. The electronic vaporizing device may further comprise at least one auxiliary electronic device power source configured to generate a supply of power to be provided to at least one auxiliary electronic device connected to the at least one power output port.

In one embodiment, the at least one power source may be comprised of at least one of a battery source, a connection to an electrical power source, and combinations thereof. The at least one battery may be selected from the group of batteries consisting of: lithium-ion batteries, thin film lithium-ion batteries, lithium-ion polymer batteries, nickel-cadmium batteries, nickel metal hydride batteries, lead-acid batteries, and/or combinations thereof. The at least one power source may comprise at least one rechargeable battery, and the at least one rechargeable battery may be operable to be recharged via at least one of the group consisting of: wireless charging, connection to an electrical power source, a motion-powered charging source, a pulse charging source, a solar charging source, a wind charging source, and combinations thereof.

In one embodiment, the at least one power output port may comprise at least one of a Universal Serial Bus (USB) port, a micro-USB port, a mini-USB port, a lightening port, a dock connector, a wireless charging area, and combinations thereof. The at least one power output port may be suitably configured to be connected to at least one of a portable computing device, smartphone, mobile phone, tablet, laptop, music player, electronic gaming device, and combinations thereof.

The electronic vaporizing device may be suitably selected from the group of electronic vaporizing devices consisting of an electronic cigarette, an electronic cigar, an electronic vapor device, an electronic vapor device integrated with an electronic communication device, a robotic vapor device, and/or a micro-size electronic vapor device.

In accordance with the embodiments disclosed herein, the present disclosure may be a method for provisioning power generated by at least one power source of an associated electronic vaporizing device, wherein the electronic vaporizing device may comprise a vaporizing component operable to vaporize materials received therein and expel the generated vapor from the vaporizing device, at least one power source operatively coupled to the vaporizing component, at least one power output port operatively coupled to the at least one power source and configured to connect to at least one auxiliary electronic device, wherein the at least one power output port is operable to provide power generated by the at least one power source to the at least one auxiliary electronic device, and a power output control component operatively coupled to the at least one power source and operable to regulate a supply of generated power provided to the vaporizing component and at least one auxiliary electronic device connected to the power outlet port. The method may comprise the steps: generating a supply of power by the at least one power source; determining a provisioning of at least a portion of the generated supply of power between the vaporizing component and the at least one auxiliary electronic device, wherein such determination is in accordance with at least one power provision parameter; and providing at least a portion of the generated supply of power to the vaporizing component and at least one auxiliary electronic device connected to the at least one power outlet port in accordance with such determination.

In a preferred embodiment, the method may further comprise: obtaining data associated with one or more of at least one operational parameter of the vaporizing component, at least one operational parameter of the at least one auxiliary electronic device, at least one power generation parameter of the at least one power source, at least one connection parameter of the connection of the at least one auxiliary electronic device to the at least one power outlet port, at least one preference parameter for the provision of available power to be provided to the vaporizing component and the at least one auxiliary electronic device, and combinations thereof; and determining, in response to at least a portion of the obtained data, at least one power provision parameter for the power output control component. The method may further comprise configuring the at least one power provision parameter of the power output control component, and regulating the generated supply of power provided to the vaporizing component and the at least one auxiliary electronic device in accordance with the at least one power provision parameter. The method may further comprise receiving at least a portion of the power provision parameter data from an associated user via the at least one input/output interface.

In one embodiment, the power may be generated by at least one of a battery source, a connection to an electrical power source, and combinations thereof. The generated supply of power provided to the at least one auxiliary electronic device may be used for at least one of operation of the at least one auxiliary electronic device, charging a rechargeable power source of the at least one auxiliary electronic device, and combinations thereof.

In accordance with other embodiments disclosed herein, the present disclosure may be a system for provisioning power between an electronic vaporizing device and at least one auxiliary electronic device. The system may comprise an electronic vaporizing device comprising a first processor operable for controlling the electronic vaporizing device, at least one container configured to store vaporizable material, a vaporizing component operatively coupled to the first processor and controlled in part by the first processor, wherein the vaporizing component may be in fluid communication with the at least one container for receiving at least a portion of the vaporizable material therefrom, wherein the vaporizing component may be operable to vaporize materials received therein, and at least one vapor outlet coupled to the vaporizing component and configured to receive vapor generated by vaporizing component, the at least one vapor outlet operable to expel the generated vapor from the vaporizing device. The electronic vaporizing device may further comprise at least one vaporizing power source operatively coupled to the vaporizing component, wherein the at least one vaporizing power source may be operable to generate a supply of power for at least the operation of the vaporizing component, at least one power output port operatively coupled to the at least one vaporizing power source and configured to connect to at least one auxiliary electronic device, wherein the at least one power output port may be operable to provide at least a portion of the supply of power generated by the at least one vaporizing power source to the at least one auxiliary electronic device, and a power output control component operatively coupled to the first processor and controlled in part by the first processor, wherein the power output control component may be operatively coupled to the at least one vaporizing power source and operable to regulate the generated supply of power provided to the vaporizing component and at least one auxiliary electronic device connected to the power outlet port. The system may further comprise an auxiliary electronic device comprising a second processor operable for controlling the auxiliary electronic device, at least one auxiliary electronic device power source operatively connected to the second processor and operable to generate a supply of power for operation of the auxiliary electronic device, and a power input port operatively connected to the at least one auxiliary electronic device power source and configured to connect with the power output port of the electronic vaporizing device, wherein the power input port may be operable to receive at least a portion of the supply of power generated by the at least one vaporizing power source.

In a preferred embodiment, the electronic vaporizing device processor may be operable to obtain data associated with at least one operational parameter of the vaporizing component, at least one operational parameter of the at least one auxiliary electronic device, at least one power generation parameter of the at least one vaporizing power source, at least one connection parameter of the connection of the at least one auxiliary electronic device to the at least one power outlet port, at least one preference parameter for provision of available power to be provided to the vaporizing component and the at least one auxiliary electronic device, and combinations thereof. The processor may be further operable to determine, in response to at least a portion of the obtained data, at least one power provision parameter for the power output control component, configure the at least one power provision parameter of the power output control component, and regulate the generated supply of power provided to the vaporizing component and the at least one auxiliary electronic device in accordance with the at least one power provision parameter.

Still other advantages, embodiments, and features of the subject disclosure will become readily apparent to those of ordinary skill in the art from the following description wherein there is shown and described a preferred embodiment of the present disclosure, simply by way of illustration of one of the best modes best suited to carry out the subject disclosure. As it will be realized, the present disclosure is capable of other different embodiments and its several details are capable of modifications in various obvious embodiments, all without departing from, or limiting, the scope herein. Accordingly, the drawings and descriptions will be regarded as illustrative in nature and not as restrictive.

BRIEF DESCRIPTION OF THE DRAWINGS

The drawings are of illustrative embodiments. They do not illustrate all embodiments. Other embodiments may be used in addition or instead. Details which may be apparent or unnecessary may be omitted to save space or for more effective illustration. Some embodiments may be practiced with additional components or steps and/or without all of the components or steps which are illustrated. When the same numeral appears in different drawings, it refers to the same or like components or steps.

FIG. 11a is a diagram of one embodiment of a detachable vaporizing device according to some embodiments.

FIG. 11b is a diagram of one embodiment of a detachable vaporizing device according to some embodiments.

FIG. 11c is a diagram of one embodiment of a detachable vaporizing device according to some embodiments.

FIG. 12a is a diagram of one embodiment of a detachable vaporizing device according to some embodiments.

FIG. 12b is a diagram of one embodiment of a detachable vaporizing device according to some embodiments.

DETAILED DESCRIPTION OF THE ILLUSTRATIVE EMBODIMENTS

Figure 1:
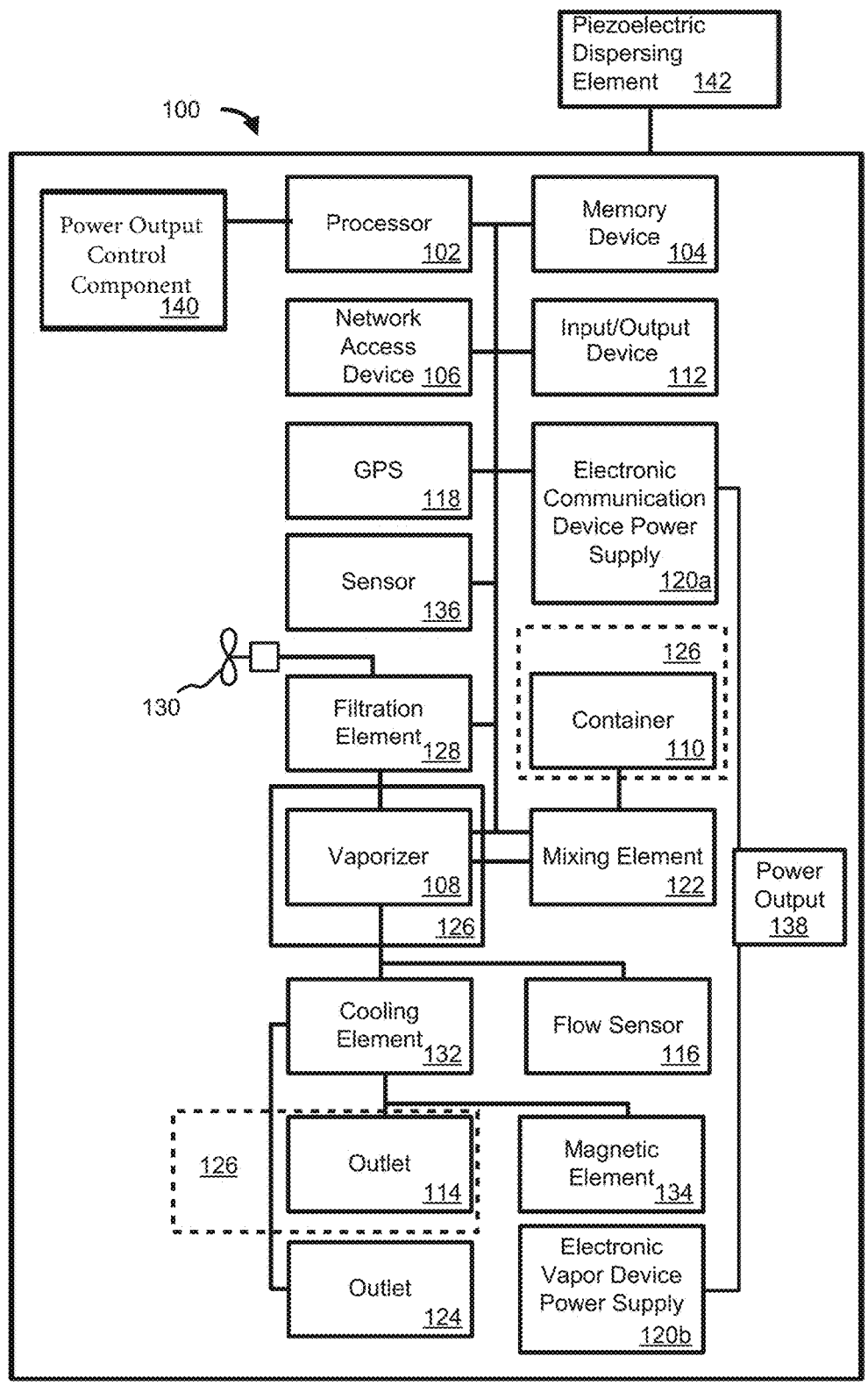
FIG. 1 illustrates a block diagram of one embodiment of an electronic vaporizing device according to some embodiments.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that may be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all embodiments of this application including, but not limited to, steps in disclosed methods. Thus, if there are a variety of additional steps that may be performed it is understood that each of these additional steps may be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, compact discs-read only memory (CD-ROMs), optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded onto a general-purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, may be implemented by special purpose hardware-based computer systems that perform the specified functions or steps, or combinations of special purpose hardware and computer instructions.

In the following description, certain terminology is used to describe certain features of one or more embodiments. For purposes of the specification, unless otherwise specified, the term "substantially" refers to the complete or nearly complete extent or degree of an action, characteristic, property, state, structure, item, or result. For example, in one embodiment, an object that is "substantially" located within a housing would mean that the object is either completely within a housing or nearly completely within a housing. The exact allowable degree of deviation from absolute completeness may in some cases depend on the specific context. However, generally speaking, the nearness of completion will be so as to have the same overall result as if absolute and total completion were obtained. The use of "substantially" is also equally applicable when used in a negative connotation to refer to the complete or near complete lack of an action, characteristic, property, state, structure, item, or result.

As used herein, the terms "approximately" and "about" generally refer to a deviance of within 5% of the indicated number or range of numbers. In one embodiment, the term "approximately" and "about", may refer to a deviance of between 0.001 10% from the indicated number or range of numbers.

Various embodiments are now described with reference to the drawings. In the following description, for purposes of explanation, numerous specific details are set forth in order to provide a thorough understanding of one or more embodiments. It may be evident, however, that the various embodiments may be practiced without these specific details. In other instances, well-known structures and devices are shown in block diagram form to facilitate describing these embodiments.

In accordance with the embodiments disclosed herein, the present disclosure is directed to an electronic vaporizing device with power control for provisioning power generated by the vaporizing device to at least one auxiliary electronic device connected to the vaporizing device. In various implementations, the electronic vaporizing device may comprise at least one power source for power generation for operation of the device, wherein at least a portion of the power generated thereby may be provided to at least one other electronic device connected or associated with the electronic vaporizing device.

In one embodiment, there may be provided a multi-function electronic vaporizing device where a user may choose to utilize the electronic vaporizing device as a source of battery charging and recharging, as an electronic vaporizing device capable of being utilized independently, as a hybrid device for a second electronic communication device, or combinations thereof.

In another embodiment, the electronic vaporizing device may be a hybrid component of a mobile electronic communication device, such as a cellular telephone, electronic tablet device, or personal computing device. The electronic vaporizing device may be a single rechargeable component, continuous with the electronic communication device, or may be portable, disposable or recyclable, removable, and combinations thereof. The devices may be either hard wired together via an electronic connection at the edges of the devices, and in some instances, with some designed overlap, depending on how the devices will optimize continuity and function. The metallic electrical connections between devices may be flush, or at least one of the devices may deploy internal connections into the other device as are known in the art. In one embodiment, the devices are connected via a protruding port penetrating precise fit positioning of the electrical connection leading from one device inside the other device to engage the electrical connection. A locking system may keep the two parts firmly in place, as though the two devices were one.

In one embodiment, the electronic vaporizing devices may comprise at least one power source for power generation for operation of the device, wherein at least a portion of the power generated thereby may be provided to at least one auxiliary electronic device connected or associated with the electronic vaporizing device. In one embodiment, the electronic vaporizing may be outfitted with the largest most powerful and rechargeable battery possible for the form factor. This allows for the device to still function as a networked electronic vaporizing device but also provides many benefits with its auxiliary power capacity.

In another embodiment, the electronic vaporizing device may comprise a solar cell charger, dynamo, hand crank, and/or charging gauge so a user does not have to have access to a power source to charge the electronic vaporizing device, although it may be deployed with other power source charging capabilities as well. The electronic vaporizing device has the potential, due to the dynamo hand crank, to add unlimited charging hours to a companion device and/or the electronic vaporizing device. The electronic vaporizing device may also be deployed with solar panels to gather power. The battery may be made from any well-known battery material assembly utilized for electronic devices as is known in the art. The wiring of the device may be flexible. In one embodiment, instead of having a power in and out to the electronic vaporizing device, there may be a conduit and flow infrastructure enabling power to be provided to or received from an auxiliary electronic device or received from a companion device.

In a further embodiment, the electronic vaporizing device may comprise a symbiotic charging system wherein the electronic vaporizing device may also receive charge from an auxiliary electronic device as well as deliver charge to an auxiliary electronic device.

FIG. 1 is a block diagram of one embodiment of an electronic vaporizing (electronic vaporizing) device 100 as described herein. The electronic vaporizing device 100 may be, for example, an electronic cigarette, an electronic cigar, an electronic vapor device, a hybrid electronic communication device coupled/integrated vapor device, a robotic vapor device, a modified vapor device ("mod"), a micro-sized electronic vapor device, and the like. The electronic vaporizing device 100 may comprise any suitable housing for enclosing and protecting the various components disclosed herein. The electronic vaporizing device 100 may comprise a processor 102 operable to control the operation of the electronic vaporizing device 100. The processor 102 may be, or may comprise, any suitable microprocessor or microcontroller, for example, a low-power application-specific controller (ASIC) and/or a field programmable gate array (FPGA) designed or programmed specifically for the task of controlling a device as described herein, or a general purpose central processing unit (CPU), for example, one based on 80×86 architecture as designed by Intel™ or AMD™, or a system-on-a-chip as designed by ARM™. The processor 102 may be coupled (e.g., communicatively, operatively, etc.) to auxiliary devices or modules of the electronic vaporizing device 100 using a bus or other coupling as is known in the art. The electronic vaporizing device 100 may comprise an electronic communication device power supply 120*a*. The electronic communication device power supply 120*a* may comprise one or more batteries and/or other power storage device (e.g., capacitor) and/or a port for connecting to an external power supply. The one or more batteries may be rechargeable. The one or more batteries may comprise a lithium-ion battery (including thin film lithium ion batteries), a lithium-ion polymer battery, a nickel-cadmium battery, a nickel metal hydride battery, a lead-acid battery, combinations thereof, and the like. For example, an external power supply may supply power to the electronic vaporizing device 100 and a battery may store at least a portion of the supplied power. The one or more batteries may be deployed with a mobile phone, personal computing device, and/or an accessory device. In one embodiment, the one or more batteries may be utilized to power at least one of the mobile phone, personal computing device, and/or the accessory device. In one embodiment, the accessory device may be a "shuttle" type device that affixes to the mobile phone or personal computing device to provide functionality, such as vapor functionality, increased battery power functionality, and the like.

In one embodiment, the electronic communication device power supply 120*a* may be configured to supply power exclusively to components that are not directly associated with vaping functionality. For example, the electronic communication device power supply 120*a* may be configured to exclusively provide power to the processor 102, a memory device 104, a network access device 106, and an input/output 112. Thus, the electronic communication device power supply 120a may be configured to not provide power to a vaporizer 108. In another embodiment, the electronic communication device power supply 120a may be configured to supply power to all components of the electronic vaporizing device 100, including the vaporizer 108.

In another embodiment, the electronic vaporizing device 100 may comprise an electronic vapor device power supply 120b. The electronic vapor device power supply 120b may be configured to supply power exclusively to components that are directly associated with vaping functionality. For example, the electronic vapor device power supply 120b may be configured to exclusively provide power to the vaporizer 108. Thus, the electronic vapor device power supply 120b may be configured to not provide power to the processor 102, a memory device 104, a network access device 106, and an input/output 112. In another embodiment, the electronic vapor device power supply 120b may be configured to supply power to all components of the electronic vaporizing device 100. In another embodiment, the electronic vapor device power supply 120b may serve as a backup power source for the electronic vaporizing device 100 in the event the electronic communication device power supply 120a fails and/or has insufficient energy to power the electronic vaporizing device 100.

While the illustrative embodiment described above and as shown in FIG. 1 shows only one electronic communication device power supply 120a and one electronic vapor device power supply 120b, it is to be understood that the electronic vaporizing device 100 may include any number of power sources as is feasible or necessary for operation of the electronic vaporizing device 100 and any auxiliary electronic devices connected thereto.

In one embodiment, one or more charging methods may be used to charge the electronic communication device power supply 120a and the electronic vapor device power supply 120b. For example, wireless charging (e.g., inductive and/or conductive), supplying a constant direct current (DC) or pulsed DC power source to a battery being charged, a motion-powered charger, a pulse charger, a solar charger, a wind charger, a Universal Serial Bus (USB) charger, combinations thereof, and the like. In a further embodiment, the electronic communication device power supply 120a and the electronic vapor device power supply 120b may be charged via a dynamo hand crank incident to the hybrid electronic communication vapor device 100.

In an embodiment, one or more of the electronic communication device power supply 120a and the electronic vapor device power supply 120b may be coupled to a power output port 138. The power output port 138 may comprise any type of output port capable of providing power (e.g., a charge) to another device. For example, the power output port 138 may comprise one or more of, a Universal Serial Bus (USB) port, a micro-USB port, a mini-USB port, a lightning port, a wireless (inductive and/or conductive) charging area, and the like. Another device, for example a portable computing device, smartphone, mobile phone, music player, electronic gaming device, the like, and combinations thereof, may connect to the power output port 138 to receive power for operation and/or for charging a battery.

As shown in FIG. 1, the electronic vaporizing device 100 may comprise a power output control component 140 operatively coupled to the processor 102, and controlled at least in part by the processor 102. The power output control component 140 may be further operatively coupled to the electronic communication device power supply 120a, and the electronic vapor device power supply 120b, or both. The power output control component 140 may be configured to regulate power provided to the electronic vaporizing device 100 and at least one auxiliary electronic device connected to the power outlet port 138. The power output control component 140 may also be operatively connected to the power outlet port 138 to control the power provided thereto. The operation of the power output control component 140 is discussed in further detail below.

The electronic vaporizing device 100 may comprise a memory device 104 coupled to the processor 102. The memory device 104 may comprise a random access memory (RAM) configured for storing program instructions and data for execution or processing by the processor 102 during control of the electronic vaporizing device 100. When the electronic vaporizing device 100 is powered off or in an inactive state, program instructions and data may be stored in a long-term memory, for example, a non-volatile magnetic optical, or electronic memory storage device (not shown). At least one of the RAM or the long-term memory may comprise a non-transitory computer-readable medium storing program instructions that, when executed by the processor 102, cause the electronic vaporizing device 100 to perform all or part of one or more methods and/or operations described herein. Program instructions may be written in any suitable high-level language, for example, C, C++, C# or the Java™, and compiled to produce machine-language code for execution by the processor 102.

In one embodiment, the electronic vaporizing device 100 may comprise a network access device 106 allowing the electronic vaporizing device 100 to be coupled to one or more ancillary devices (not shown) such as via an access point (not shown) of a wireless telephone network, local area network, or other coupling to a wide area network, for example, the Internet. In that regard, the processor 102 may be configured to share data with the one or more ancillary devices via the network access device 106. The shared data may comprise, for example, usage data and/or operational data of the electronic vaporizing device 100, a status of the electronic vaporizing device 100, a status and/or operating condition of one or more of the components of the electronic vaporizing device 100, text to be used in a message, a product order, payment information, and/or any other data. Similarly, the processor 102 may be configured to receive control instructions from the one or more ancillary devices via the network access device 106. For example, a configuration of the electronic vaporizing device 100, an operation of the electronic vaporizing device 100, and/or other settings of the electronic vaporizing device 100, may be controlled by the one or more ancillary devices via the network access device 106. For example, an ancillary device may comprise a server that may provide various services and another ancillary device may comprise a smartphone for controlling operation of the electronic vaporizing device 100. In some embodiments, the smartphone or another ancillary device may be used as a primary input/output of the electronic vaporizing device 100 such that data may be received by the electronic vaporizing device 100 from the server, transmitted to the smartphone, and output on a display of the smartphone. In an embodiment, data transmitted to the ancillary device may comprise a mixture of vaporizable material and/or instructions to release vapor. For example, the electronic vaporizing device 100 may be configured to determine a need for the release of vapor into the atmosphere. The electronic vaporizing device 100 may provide instructions via the network access device 106 to an ancillary device (e.g., another vapor device) to release vapor into the atmosphere.

In an embodiment, the electronic vaporizing device 100 may also comprise an input/output device 112 coupled to one or more of the processor 102, the vaporizer 108, the network access device 106, and/or any other electronic component of the electronic vaporizing device 100. Input may be received from a user or another device and/or output may be provided to a user or another device via the input/output device 112. The input/output device 112 may comprise any combinations of input and/or output devices such as buttons, knobs, keyboards, touchscreens, displays, light-emitting elements, a speaker, and/or the like. In an embodiment, the input/output device 112 may comprise an interface port (not shown) such as a wired interface, for example a serial port, a Universal Serial Bus (USB) port, an Ethernet port, or other suitable wired connection. The input/output device 112 may comprise a wireless interface (not shown), for example a transceiver using any suitable wireless protocol, for example wireless fidelity (WiFi) (IEEE 802.11), Bluetooth®, infrared, or other wireless standard. For example, the input/output device 112 may communicate with a smartphone via Bluetooth® such that the inputs and outputs of the smartphone may be used by the user to interface with the electronic vaporizing device 100. In an embodiment, the input/output device 112 may comprise a user interface. The user interface user interface may comprise at least one of lighted signal lights, gauges, boxes, forms, check marks, avatars, visual images, graphic designs, lists, active calibrations or calculations, 2D interactive fractal designs, 3D fractal designs, 2D and/or 3D representations of vapor devices and other interface system functions.

In an embodiment, the input/output device 112 may comprise a touchscreen interface and/or a biometric interface. For example, the input/output device 112 may include controls that allow the user to interact with and input information and commands to the electronic vaporizing device 100. For example, with respect to the embodiments described herein, the input/output device 112 may comprise a touch screen display. The input/output device 112 may be configured to provide the content of the exemplary screen shots shown herein, which are presented to the user via the functionality of a display. User inputs to the touch screen display are processed by, for example, the input/output device 112 and/or the processor 102. The input/output device 112 may also be configured to process new content and communications to the electronic vaporizing device 100. The touch screen display may provide controls and menu selections, and process commands and requests. Application and content objects may be provided by the touch screen display. The input/output device 112 and/or the processor 102 may receive and interpret commands and other inputs, interface with the other components of the electronic vaporizing device 100 as required. In an embodiment, the touch screen display may enable a user to lock, unlock, or partially unlock or lock, the electronic vaporizing device 100. The electronic vaporizing device 100 may be transitioned from an idle and locked state into an open state by, for example, moving or dragging an icon on the screen of the electronic vaporizing device 100, entering in a password/passcode, and the like. The input/output device 112 may thus display information to a user such as a puff count, an amount of vaporizable material remaining in the container 110, battery remaining, signal strength, combinations thereof, and the like.

In an embodiment, the input/output device 112 may comprise an audio user interface. A microphone may be configured to receive audio signals and relay the audio signals to the input/output device 112. The audio user interface may be any interface that is responsive to voice or other audio commands. The audio user interface may be configured to cause an action, activate a function, etc., by the electronic vaporizing device 100 (or another device) based on a received voice (or other audio) command. The audio user interface may be deployed directly on the electronic vaporizing device 100 and/or via other electronic devices (e.g., electronic communication devices, such as a smartphone, a smart watch, a tablet, a laptop, a dedicated audio user interface device, other personal computing devices, and the like). The audio user interface may be used to control the functionality of the electronic vaporizing device 100. Such functionality may comprise, but is not limited to, custom mixing of vaporizable material (e.g., eLiquids) and/or ordering custom made eLiquid combinations via an eCommerce service (e.g., specifications of a user's custom flavor mix may be transmitted to an eCommerce service, so that an eLiquid provider may mix a custom eLiquid cartridge for the user). The user may then reorder the custom flavor mix anytime or even send it to friends as a present, all via the audio user interface. The user may also send via voice command a mixing recipe to other users. The other users may utilize the mixing recipe (e.g., via an electronic vapor device having multiple chambers for eLiquid) to sample the same mix via an auto-order to the other users' devices to create the received mixing recipe. A custom mix may be given a title by a user and/or may be defined by parts (e.g., one part liquid A and two parts liquid B). The audio user interface may also be utilized to create and send a custom message to other users, to join electronic vaporizing clubs, to receive electronic vaporizing chart information, and to conduct a wide range of social networking, location services and eCommerce activities. The audio user interface may be secured via a password (e.g., audio password) which features at least one of tone recognition, other voice quality recognition and, in one embodiment, may utilize at least one special cadence as part of the audio password.

The input/output device 112 may be configured to interface with other devices, for example, exercise equipment, computing equipment, communications devices and/or other vapor devices, for example, via a physical or wireless connection. The input/output device 112 may thus exchange data with the other equipment. A user may sync their electronic vaporizing device 100 to other devices, via programming attributes such as mutual dynamic link library (DLL) "hooks". This enables a smooth exchange of data between devices, as may a web interface between devices. The input/output device 112 may be used to upload one or more profiles to the other devices. Using exercise equipment as an example, the one or more profiles may comprise data such as workout routine data (e.g., timing, distance, settings, heart rate, etc.) and vaping data (e.g., eLiquid mixture recipes, supplements, vaping timing, etc.). Data from usage of previous exercise sessions may be archived and shared with new electronic vapor devices and/or new exercise equipment so that history and preferences may remain continuous and provide for simplified device settings, default settings, and recommended settings based upon the synthesis of current and archival data.

In an embodiment, the electronic vaporizing device 100 may comprise a vaporizer 108. The vaporizer 108 may be coupled to one or more containers 110. Each of the one or more containers 110 may be configured to hold one or more vaporizable or non-vaporizable materials. The vaporizer 108 may receive the one or more vaporizable or non-vaporizable materials from the one or more containers 110 and heat the one or more vaporizable or non-vaporizable materials until the one or more vaporizable or non-vaporizable materials achieve a vapor state. In various embodiments, instead of heating the one or more vaporizable or non-vaporizable materials, the vaporizer 108 may nebulize or otherwise cause the one or more vaporizable or non-vaporizable materials in the one or more containers 110 to reduce in size into particulates. In various embodiments, the one or more containers 110 may comprise a compressed liquid that may be released to the vaporizer 108 via a valve or another mechanism. In various embodiments, the one or more containers 110 may comprise a wick (not shown) through which the one or more vaporizable or non-vaporizable materials is drawn to the vaporizer 108. The one or more containers 110 may be made of any suitable structural material, such as, an organic polymer, metal, ceramic, composite, or glass material.

In an embodiment, the electronic vaporizing device 100 may comprise a mixing element 122. The mixing element 122 may be coupled to the processor 102 to receive one or more control signals. The one or more control signals may instruct the mixing element 122 to withdraw specific amounts of fluid from the one or more containers 110. The mixing element may, in response to a control signal from the processor 102, withdraw select quantities of vaporizable material to create a customized mixture of different types of vaporizable material. The liquid withdrawn by the mixing element 122 may be provided to the vaporizer 108.

In an embodiment, input from the input/output device 112 may be used by the processor 102 to cause the vaporizer 108 to vaporize the one or more vaporizable or non-vaporizable materials. For example, a user may depress a button, causing the vaporizer 108 to start vaporizing the one or more vaporizable or non-vaporizable materials. A user may then draw on an outlet 114 to inhale the vapor. In various embodiments, the processor 102 may control vapor production and flow to the outlet 114 based on data detected by a flow sensor 116. For example, as a user draws on the outlet 114, the flow sensor 116 may detect the resultant pressure and provide a signal to the processor 102. In response, the processor 102 may cause the vaporizer 108 to begin vaporizing the one or more vaporizable or non-vaporizable materials, terminate vaporizing the one or more vaporizable or non-vaporizable materials, and/or otherwise adjust a rate of vaporization of the one or more vaporizable or non-vaporizable materials. In another embodiment, the vapor may exit the electronic vaporizing device 100 through an outlet 124. The outlet 124 differs from the outlet 114 in that the outlet 124 may be configured to distribute the vapor into the local atmosphere, rather than being inhaled by a user. In an embodiment, vapor exiting the outlet 124 may be at least one of aromatic, medicinal, recreational, and/or wellness related.

In another embodiment, the electronic vaporizing device 100 may comprise a piezoelectric dispersing element 142. In some embodiments, the piezoelectric dispersing element 142 may be charged by a battery, and may be driven by a processor on a circuit board. The circuit board may be produced using a polyimide such as Kapton®, or other suitable material. The piezoelectric dispersing element 142 may comprise a thin metal disc which causes dispersion of the fluid fed into the dispersing element via the wick or other soaked piece of organic material through vibration. Once in contact with the piezoelectric dispersing element 142, the vaporizable material (e.g., fluid) may be vaporized (e.g., turned into vapor or mist) and the vapor may be dispersed via a system pump and/or a sucking action of the user. In some embodiments, the piezoelectric dispersing element 142 may cause dispersion of the vaporizable material by producing ultrasonic vibrations. An electric field applied to a piezoelectric material within the piezoelectric dispersing element 142 may cause ultrasonic expansion and contraction of the piezoelectric material, resulting in ultrasonic vibrations to the disc. The ultrasonic vibrations may cause the vaporizable material to disperse, thus forming a vapor or mist from the vaporizable material.

In some embodiments, the connection between a power supply (for example, the electronic communication device power supply 120*a* and/or the electronic vapor device power supply 120*b*) and the piezoelectric dispersing element 142 may be facilitated using one or more conductive coils. The conductive coils may provide an ultrasonic power input to the piezoelectric dispersing element 142. For example, the signal carried by the coil may have a frequency of approximately 107.8 kHz. In some embodiments, the piezoelectric dispersing element 142 may comprise a piezoelectric element that may receive the ultrasonic signal transmitted from the power supply through the coils, and may cause vaporization of the vaporizable liquid by producing ultrasonic vibrations. An ultrasonic electric field applied to a piezoelectric material within the piezoelectric element causes ultrasonic expansion and contraction of the piezoelectric material, resulting in ultrasonic vibrations according to the frequency of the signal. The vaporizable liquid may be vibrated by the ultrasonic energy produced by the piezoelectric dispersing element 142, thus causing dispersal and/or atomization of the liquid. In an embodiment, the electronic vaporizing device 100 may be configured to permit a user to select between using a heating element of the vaporizer 108 or the piezoelectric dispersing element 142. In another embodiment, the electronic vaporizing device 100 may be configured to permit a user to utilize both a heating element of the vaporizer 108 and the piezoelectric dispersing element 142.

In an embodiment, the electronic vaporizing device 100 may comprise a heating casing 126. The heating casing 126 may enclose one or more of the container 110, the vaporizer 108, and/or the outlet 114. In a further embodiment, the heating casing 126 may enclose one or more components that make up the container 110, the vaporizer 108, and/or the outlet 114. The heating casing 126 may be made of ceramic, metal, and/or porcelain. The heating casing 126 may have varying thickness. In an embodiment, the heating casing 126 may be coupled to the power supply 120 to receive power to heat the heating casing 126. In another embodiment, the heating casing 126 may be coupled to the vaporizer 108 to heat the heating casing 126. In another embodiment, the heating casing 126 may serve as an insulator.

In an embodiment, the electronic vaporizing device 100 may comprise a filtration element 128. The filtration element 128 may be configured to remove (e.g., filter, purify, etc.) contaminants from air entering the electronic vaporizing device 100. The filtration element 128 may optionally comprise a fan 130 to assist in delivering air to the filtration element 128. The electronic vaporizing device 100 may be configured to intake air into the filtration element 128, filter the air, and pass the filtered air to the vaporizer 108 for use in vaporizing the one or more vaporizable or non-vaporizable materials. In another embodiment, the electronic vaporizing device 100 may be configured to intake air into the filtration element 128, filter the air, and bypass the vaporizer 108 by passing the filtered air directly to the outlet 114 for inhalation by a user.

In an embodiment, the filtration element 128 may comprise cotton, polymer, wool, satin, meta materials, and the like. The filtration element 128 may comprise a filter material that at least one airborne particle and/or undesired gas by a mechanical mechanism, an electrical mechanism, and/or a chemical mechanism. The filter material may comprise one or more pieces of a filter fabric that may filter out one or more airborne particles and/or gasses. The filter fabric may be a woven and/or non-woven material. The filter fabric may be made from natural fibers (e.g., cotton, wool, etc.) and/or from synthetic fibers (e.g., polyester, nylon, polypropylene, etc.). The thickness of the filter fabric may be varied depending on the desired filter efficiencies and/or the region of the apparel where the filter fabric is to be used. The filter fabric may be designed to filter airborne particles and/or gasses by mechanical mechanisms (e.g., weave density), by electrical mechanisms (e.g., charged fibers, charged metals, etc.), and/or by chemical mechanisms (e.g., absorptive charcoal particles, adsorptive materials, etc.). In as embodiment, the filter material may comprise electrically charged fibers such as, but not limited to, Filtrete® by 3M. In another embodiment, the filter material may comprise a high-density material similar to material used for medical masks which are used by medical personnel in doctors' offices, hospitals, and the like. In an embodiment, the filter material may be treated with an anti-bacterial solution and/or otherwise made from anti-bacterial materials. In another embodiment, the filtration element 128 may comprise electrostatic plates, ultraviolet light, a High Efficiency Particulate Air (HEPA) filter, combinations thereof, and the like.

In an embodiment, the electronic vaporizing device 100 may comprise a cooling element 132. The cooling element 132 may be configured to cool vapor exiting the vaporizer 108 prior to passing through the outlet 114. The cooling element 132 may cool vapor by utilizing air or space within the electronic vaporizing device 100. The air used by the cooling element 132 may be either static (existing in the electronic vaporizing device 100) or drawn into an intake and through the cooling element 132 and the electronic vaporizing device 100. The intake may comprise various pumping, pressure, fan, or other intake systems for drawing air into the cooling element 132. In an embodiment, the cooling element 132 may reside separately or may be integrated the vaporizer 108. The cooling element 132 may be a single cooled electronic element within a tube or space and/or the cooling element 132 may be configured as a series of coils or as a grid like structure. The materials for the cooling element 132 may be metal, liquid, polymer, natural substance, synthetic substance, air, or any combination thereof. The cooling element 132 may be powered by the power supply 120b, by a separate battery (not shown), or other power source (not shown) including the use of excess heat energy created by the vaporizer 108 being converted to energy used for cooling by a small turbine or pressure system to convert the energy. Heat differentials between the vaporizer 108 and the cooling element 132 may also be converted to energy utilizing commonly known geothermal energy principles.

In an embodiment, the electronic vaporizing device 100 may comprise a magnetic element 134. For example, the magnetic element 134 may comprise an electromagnet, a ceramic magnet, a ferrite magnet, rare earth magnet, and/or the like. The magnetic element 134 may be configured to apply a magnetic field to air as it is brought into the electronic vaporizing device 100, in the vaporizer 108, and/or as vapor exits the outlet 114.

The input/output device 112 may be used to select whether vapor exiting the outlet 114 should be cooled or not cooled, heated or not heated, and/or magnetized or not magnetized. For example, a user may use the input/output device 112 to selectively cool vapor at times and not cool vapor at other times. The user may use the input/output device 112 to selectively heat vapor at times and not heat vapor at other times. The user may use the input/output device 112 to selectively magnetize vapor at times and not magnetize vapor at other times. The user may further use the input/output device 112 to select a desired smoothness, temperature, and/or range of temperatures. The user may adjust the temperature of the vapor by selecting or clicking on a clickable setting on a part of the electronic vaporizing device 100. The user may use, for example, a graphical user interface (GUI) or a mechanical input enabled by clicking a rotational mechanism at either end of the electronic vaporizing device 100.

In an embodiment, cooling control may be set within the electronic vaporizing device 100 settings via the processor 102 and system software (e.g., dynamic linked libraries). The memory 104 may store settings. Suggestions and remote settings may be communicated to and/or from the electronic vaporizing device 100 via the input/output device 112 and/or the network access device 106. Cooling of the vapor may be set and calibrated between heating and cooling mechanisms to what is deemed an ideal temperature by the manufacturer of the electronic vaporizing device 100 for the vaporizable material. For example, a temperature may be set such that resultant vapor delivers the coolest feeling to the average user but does not present any health risk to the user by the vapor being too cold, including the potential for rapid expansion of cooled vapor within the lungs and the damaging of tissue by vapor which has been cooled to a temperature which may cause frostbite like symptoms.

In an embodiment, the electronic vaporizing device 100 may be configured to receive air, smoke, vapor or other material and analyze the contents of the air, smoke, vapor or other material using one or more sensors 136 to at least one of analyze, classify, compare, validate, refute, and/or catalogue the same. A result of the analysis may be, for example, an identification of at least one of medical, recreational, homeopathic, olfactory elements, spices, other cooking ingredients, ingredients analysis from food products, fuel analysis, pharmaceutical analysis, genetic modification testing analysis, dating, fossil and/or relic analysis and the like. The electronic vaporizing device 100 may utilize, for example, mass spectrometry, Potential Hydrogen (PH) testing, genetic testing, particle and/or cellular testing, sensor based testing and other diagnostic and wellness testing, either via locally available components or by transmitting data to a remote system for analysis.

In an embodiment, a user may create a custom scent by using the electronic vaporizing device 100 to intake air elements, wherein the electronic vaporizing device 100 (or third-party networked device) analyzes the olfactory elements and/or biological elements within the sample. The electronic vaporizing device 100 and then formulates a replica scent within the electronic vaporizing device 100 (or third-party networked device) that may be accessed by the user instantly or at a later date, with the ability to purchase this custom scent from a networked ecommerce portal.

In another embodiment, the one or more sensors 136 may be configured to sense negative environmental conditions (e.g., adverse weather, smoke, fire, chemicals (e.g., such as CO2 or formaldehyde), adverse pollution, and/or disease outbreaks, and the like). The one or more sensors 136 may comprise one or more of, a biochemical/chemical sensor, a thermal sensor, a radiation sensor, a mechanical sensor, an optical sensor, a mechanical sensor, a magnetic sensor, an electrical sensor, combinations thereof and the like. The biochemical/chemical sensor may be configured to detect one or more biochemical/chemicals causing a negative environmental condition such as, but not limited to, smoke, a vapor, a gas, a liquid, a solid, an odor, combinations thereof, and the like. The biochemical/chemical sensor may comprise one or more of a mass spectrometer, a conducting/nonconducting regions sensor, a Surface Acoustic Wave (SAW) sensor, a quartz microbalance sensor, a conductive composite sensor, a chemiresistor, a metal oxide gas sensor, an organic gas sensor, a metal-oxide-semiconductor field-effect transistor (MOSFET), a piezoelectric device, an infrared sensor, a sintered metal oxide sensor, a Pd-gate MOSFET, a metal field-effect transistor (FET) structure, an electrochemical cell, a conducting polymer sensor, a catalytic gas sensor, an organic semiconducting gas sensor, a solid electrolyte gas sensors, a piezoelectric quartz crystal sensor, and/or combinations thereof.

The thermal sensor may be configured to detect temperature, heat, heat flow, entropy, heat capacity, combinations thereof, and the like. Exemplary thermal sensors include, but are not limited to, thermocouples, such as semiconducting thermocouples, noise thermometry, thermoswitches, thermistors, metal thermoresistors, semiconducting thermoresistors, thermodiodes, thermotransistors, calorimeters, thermometers, indicators, and fiber optics.

The radiation sensor may be configured to detect gamma rays, X-rays, ultra-violet rays, visible, infrared, microwaves and radio waves. Exemplary radiation sensors are suitable for use in the present invention that include, but are not limited to, nuclear radiation microsensors, such as scintillation counters and solid state detectors; ultra-violet, visible and near infrared radiation microsensors, such as photoconductive cells; photodiodes; phototransistors; infrared radiation microsensors, such as photoconductive IR sensors; and pyroelectric sensors.

The optical sensor may be configured to detect visible, near infrared, and infrared waves. The mechanical sensor may be configured to detect displacement, velocity, acceleration, force, torque, pressure, mass, flow, acoustic wave-length, and amplitude. Exemplary mechanical sensors are suitable for use in the present invention and include, but are not limited to, displacement microsensors, capacitive and inductive displacement sensors, optical displacement sensors, ultrasonic displacement sensors, pyroelectric, velocity and flow microsensors, transistor flow microsensors, acceleration microsensors, piezoresistive microaccelerometers, force, pressure and strain microsensors, and piezoelectric crystal sensors. The magnetic sensor may be configured to detect magnetic field, flux, magnetic moment, magnetization, and magnetic permeability. The electrical sensor may be configured to detect charge, current, voltage, resistance, conductance, capacitance, inductance, dielectric permittivity, polarization and frequency.

Upon sensing a negative environmental condition, the one or more sensors 136 may provide data to the processor 102 to determine the nature of the negative environmental condition and to generate/transmit one or more alerts based on the negative environmental condition. The one or more alerts may be deployed to the electronic vaporizing device 100 user's wireless device and/or synced accounts. For example, the network access device 106 may be used to transmit the one or more alerts directly (e.g., via Bluetooth®) to a user's smartphone to provide information to the user. In another embodiment, the network access device 106 may be used to transmit sensed information and/or the one or more alerts to a remote server for use in syncing one or more other devices used by the user, e.g., other vapor devices, other electronic devices (smartphones, tablets, laptops, etc.). In another embodiment, the one or more alerts may be provided to the user of the electronic vaporizing device 100 via vibrations, audio, colors, and the like deployed from the mask, for example through the input/output device 112. For example, the input/output device 112 may comprise a small vibrating motor to alert the user to one or more sensed conditions via tactile sensation. In another example, the input/output device 112 may comprise one or more light-emitting diodes (LED's) of various colors to provide visual information to the user. In another example, the input/output device 112 may comprise one or more speakers that may provide audio information to the user. For example, various patterns of beeps, sounds, and/or voice recordings may be utilized to provide the audio information to the user. In another example, the input/output device 112 may comprise an liquid crystal display (LCD) screen/touch-screen that provides a summary and/or detailed information regarding the negative environmental condition and/or the one or more alerts.

In another embodiment, upon sensing a negative environmental condition, the one or more sensors 136 may provide data to the processor 102 to determine the nature of the negative environmental condition and to provide a recommendation for mitigating and/or to actively mitigate the negative environmental condition. Mitigating the negative environmental conditions may comprise, for example, applying a filtration system, a fan, a fire suppression system, engaging a heating, ventilation, and air conditioning (HVAC) system, and/or one or more vaporizable and/or non-vaporizable materials. The processor 102 may access a database stored in the memory device 104 to make such a determination or the network device 106 may be used to request information from a server to verify the sensor findings. In an embodiment, the server may provide an analysis service to the electronic vaporizing device 100. For example, the server may analyze data sent by the electronic vaporizing device 100 based on a reading from the one or more sensors 136. The server may determine and transmit one or more recommendations to the electronic vaporizing device 100 to mitigate the sensed negative environmental condition. The electronic vaporizing device 100 may use the one or more recommendations to activate a filtration system, a fan, a fire suppression system engaging a HVAC system, and/or to vaporize one or more vaporizable or non-vaporizable materials to assist in countering effects from the negative environmental condition.

In an embodiment, the electronic vaporizing device 100 may comprise a global positioning system (GPS) unit 118. The GPS 118 may detect a current location of the device 100. In some embodiments, a user may request access to one or more services that rely on a current location of the user. For example, the processor 102 may receive location data from the GPS 118, convert it to usable data, and transmit the usable data to the one or more services via the network access device 106. The GPS unit 118 may receive position information from a constellation of satellites operated by the U.S. Department of Defense. Alternately, the GPS unit 118 may be a Global Navigation Satellite System (GLONASS) receiver operated by the Russian Federation Ministry of Defense, or any other positioning device capable of providing accurate location information (for example, long range navigation (LORAN), inertial navigation, and the like). The GPS unit 118 may contain additional logic, either software, hardware or both to receive the Wide Area Augmentation System (WAAS) signals, operated by the Federal Aviation Administration, to correct dithering errors and provide the most accurate location possible. Overall accuracy of the positioning equipment subsystem containing WAAS is generally in the two-meter range.

In operation, at least one power supply source of the electronic vaporizing device 100, such as the electronic communication device power supply 120*a* and/or the electronic vapor device power supply 120*b*, generates a supply of power. The power generated may be provided for at least one of the operation of the electronic vaporizing device 100, such as operation of the vaporizer 108, the operation of at least one other electronic device connected or associated with the electronic vaporizing device, power source recharging of at least one other electronic device connected or associated with the electronic vaporizing device, and combinations thereof. The power output control component 140 regulates the power provided to the vaporizer 108 and to the at least one other electronic device.

In one embodiment, the power output control component 140 may be operable to determine, control, and/or regulate the provisioning of at least a portion of the generated power between the vaporizer 108 (or other component or functionality of the electronic vaporizing device 100) and the at least one auxiliary electronic device. The power output control component 140 may suitably be implemented as logic operable to be executed by processor 102. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit ("ASIC"), system on a chip ("SoC"), programmable system on a chip ("PSOC"), a programmable/programmed logic device, memory device containing instructions, or the like, or combinational logic embodied in hardware. Logic may also be fully embodied as software stored on a non-transitory, tangible medium which performs a described function when executed by a processor. Logic may suitably comprise one or more modules configured to perform one or more functions.

In a preferred embodiment, the power output control component 140 determines the provisioning of at least a portion of the generated supply of power between electronic vaporizing device 100 and the at least one auxiliary electronic device in accordance with at least one power provision parameter, and then provides the generated supply of power to the electronic vaporizing device 100 and at least one auxiliary electronic device connected to the at least one power outlet port in accordance with such determination. The at least one power provision parameter may be determined based on at least one operational parameter of the electronic vaporizing device, at least one operational parameter of the at least one auxiliary electronic device, at least one power generation parameter of the at least one power source, at least one connection parameter of the connection of the at least one auxiliary electronic device to the at least one power outlet port, at least one preference parameter for the provision of available power to be provided to the vaporizing component and the at least one auxiliary electronic device, and combinations thereof.

As an example, operational parameters of the electronic vaporizing device 100 include, but are not limited to, the power required to operate the electronic vaporizing device 100, the power required to operate the vaporizer 108 and associated vaping functionality, the operational status of the electronic vaporizing device 100 (on/off/sleep etc.), the operational status of the vaporizer 108, and the like. Operational parameters of the at least one auxiliary electronic device include, but are not limited to, the power required to operate the electronic device, the operational status of the device, the status of a power source associated with device, applications/accessories associated and/or operating on the device, and the like. Power generation parameters of the at least one source include, but are not limited to, the amount of power able to be generated thereby, the amount of power available (battery life), the operational status of the power source, and the like. Connection parameters of the connection of the at least one auxiliary electronic device to the power outlet port 138 include, but are not limited to, the type of connection, the amount of power that may be transmitted therethrough, the status of the connection (continuous, intermittent), and the like. Preference parameters include, but are not limited to, a priority as which device or devices should receive available power first, operational situations wherein a certain device or devices receive available power first (vaporizer is operational, so power is provided to vaporizer first), battery charging status of a device, and the like.

Data relating to the operational parameters of the electronic vaporizing device 100, operational parameters of the at least one auxiliary electronic device, power generation parameters of the at least one power source, connection parameters, and preference parameters may be obtained by any suitable means. In a preferred embodiment, the power output control component 140 receives the preference parameter data from an associated user, other computer system, device, network, or the like via the input/output interface 112, through the network access device 106, sensor 136, via a computer readable medium, or combinations thereof. For example, the operational parameters of the electronic vaporizing device 100 and the power generated by the at least one power source may be set during manufacturing and provided within the processor 102. The operational parameters of the at least one auxiliary electronic device may be transmitted from such device to the processor 102.

In one embodiment, a user may input desired preference parameters for the provision of available power via a user interface associated with the input/output interface 112. The input/output interface 112 may include the functionality to allow an associated user to select parameters, features or other options for the provision of power between the electronic vaporizing device 100 and at least one auxiliary electronic device.

In one embodiment, the power output control component 140 determines, in response to data obtained relating to at least one of operational parameters of the electronic vaporizing device 100, operational parameters of the at least one auxiliary electronic device, power generation parameters of the at least one power source, connection parameters, and power provision preference parameters at least one power provision parameter. The power output control component 140 then regulates the generated supply of power provided to the electronic vaporizing device 100 and the at least one auxiliary electronic device in accordance with the at least one power provision parameter.

For example, in one embodiment, the power output control component 140 may configure the electronic communication device power supply 120a to exclusively provide power to the processor 102, a memory device 104, a network access device 106, and an input/output 112 and not to provide power to a vaporizer 108. In another embodiment, the power output control component 140 may configure the electronic vapor device power supply 120b to supply power exclusively to components that are directly associated with vaping functionality, such as vaporizer 108, and not to provide power to the processor 102, a memory device 104, a network access device 106, and an input/output 112. In another embodiment, the electronic communication device power supply 120a may serve as a backup power source for the electronic vaporizing device 100 in the event the electronic vapor device power supply 120b fails and/or has insufficient energy to power the electronic vaporizing device 100.

It is to be understood that the provisioning of power between the electronic vaporizing device 100 and the at least one auxiliary electronic device may be modified or adjusted in any manner or at any time as desired or required to meet new or changing power requirements. For example, the provisioning of power between the electronic vaporizing device 100 and the at least one auxiliary electronic device may change based on updated operational parameters for the electronic vaporizing device 100, an addition and/or change in an auxiliary electronic device connected to the electronic vaporizing device 100, new or updated power provision preference parameters, and the like.

Figure 2:
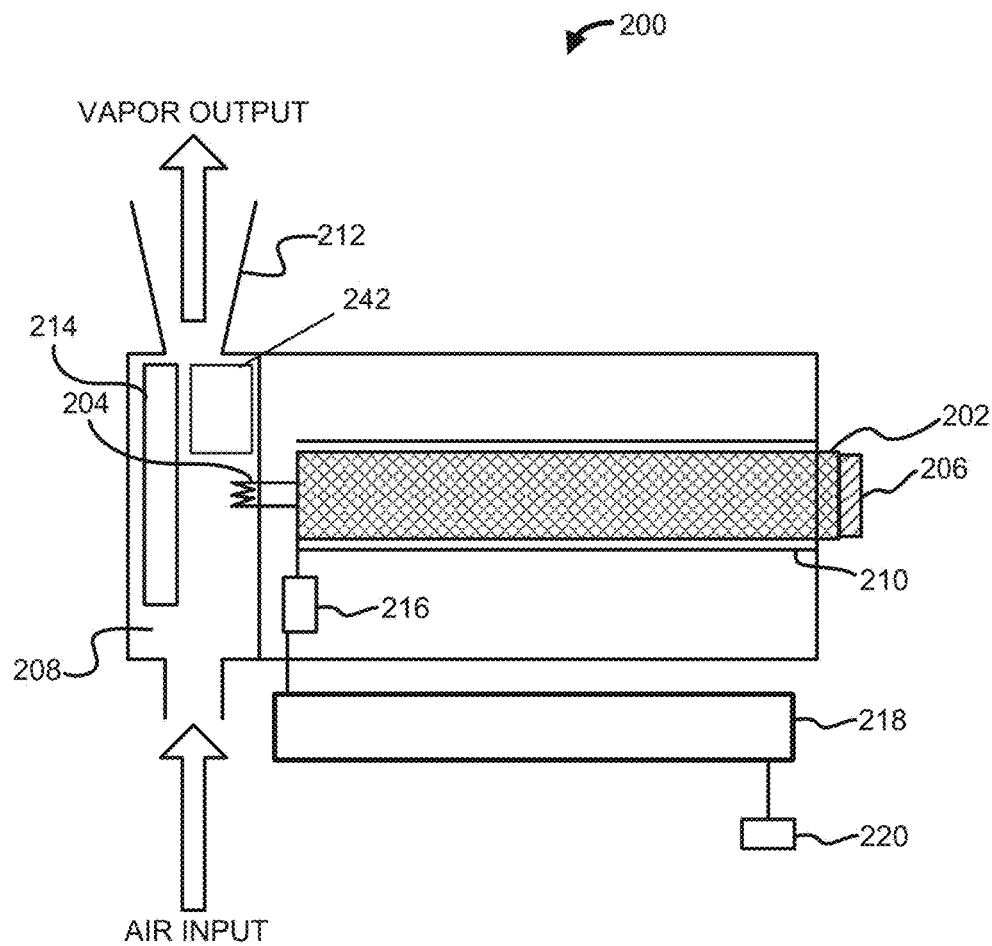
FIG. 2 is a diagram of one embodiment of an electronic vaporizing device according to some embodiments.

FIG. 2 illustrates one embodiment of an electronic vaporizer 200. The vaporizer 200 may be, for example, an e-cigarette, an e-cigar, an electronic vapor device, a hybrid electronic communication handset coupled/integrated vapor device, a robotic vapor device, a modified vapor device "mod," a micro-sized electronic vaporizing device, a robotic vapor device, and the like. The vaporizer 200 may be used internally of the electronic vaporizing device 100 or may be a separate device. For example, the vaporizer 200 may be used in place of the vaporizer 108.

The vaporizer 200 may comprise or be coupled to one or more containers 202 containing a vaporizable material, for example a fluid. For example, coupling between the vaporizer 200 and the one or more containers 202 may be via a wick 204, a valve, or by some other coupling/engagement structure. Coupling may operate independently of gravity, such as by capillary action or pressure drop through a valve. The vaporizer 200 may be configured to vaporize the vaporizable material from the one or more containers 202 at controlled rates in response to mechanical input from a component of the electronic vaporizing device 100, and/or in response to control signals from the processor 102 or another component. Vaporizable material (e.g., fluid) may be supplied by one or more replaceable cartridges 206. In an embodiment, the vaporizable material may comprise aromatics and/or aromatic elements. In an embodiment, the aromatic elements may be medicinal, recreational, therapeutic, and/or wellness related. The aromatic element may include, but is not limited to, at least one of lavender or other floral aromatic eLiquids, mint, menthol, herbal, extracts, soil or geologic, plant based, name brand perfumes, custom mixed perfume formulated inside the electronic vaporizing device 100 and aromas constructed to replicate the smell of different geographic places, conditions, and/or occurrences. For example, the smell of places may include specific or general sports venues, well known travel destinations, the mix of one's own personal space or home. The smell of conditions may include, for example, the smell of a pet, a baby, a season, a general environment (e.g., a forest), a new car, a sexual nature (e.g., musk, pheromones, etc.). The one or more replaceable cartridges 206 may contain the vaporizable material. If the vaporizable material is liquid, the cartridge may comprise the wick 204 to aid in transporting the liquid to a mixing chamber 208. In the alternative, some other transport mode may be used. Each of the one or more replaceable cartridges 206 may be configured to fit inside and engage removably with a receptacle (such as the container 202 and/or a secondary container) of the electronic vaporizing device 100. In an alternative, or in addition, one or more fluid containers 210 may be fixed in the electronic vaporizing device 100 and configured to be refillable. In an embodiment, one or more materials may be vaporized at a single time by the vaporizer 200. For example, some material may be vaporized and drawn through an exhaust port 212 and/or some material may be vaporized and exhausted via a smoke simulator outlet (not shown).

In operation, a heating element 214 may vaporize or nebulize the vaporizable material in the mixing chamber 208, producing an inhalable vapor/mist that may be expelled via the exhaust port 212. In an embodiment, the heating element 214 may comprise a heater coupled to the wick (or a heated wick) 204 operatively coupled to (for example, in fluid communication with) the mixing chamber 208. The heating element 214 may comprise a nickel-chromium wire or the like, with a temperature sensor (not shown) such as a thermistor or thermocouple. Within definable limits, by controlling power to the wick 204, a rate of vaporization may be independently controlled. Multiplexer 216 may receive power from a vaporizer power supply 218 and/or from a power supply built into the electronic vaporizing device 100 (for example, the electronic communication device power supply 120a and/or the electronic vapor device power supply 120b). At a minimum, control may be provided between no power (off state) and one or more powered states. Other control mechanisms may also be suitable.

In an embodiment, one or more charging methods may be used to charge the vaporizer power supply 218 (e.g., auxiliary power supply). For example, wireless charging (e.g., inductive and/or conductive), supplying a constant DC or pulsed DC power source to a battery being charged, a motion-powered charger, a pulse charger, a solar charger, a wind charger, a Universal Serial Bus (USB) charger, combinations thereof, and the like. In a further embodiment, the vaporizer power supply 218 may be charged via a dynamo hand crank incident to the electronic vaporizing device 100 and/or a dynamo hand crank incident to the vaporizer 200. The power output control component 140 of the electronic vaporizing device 100 regulates the power to be provided to the vaporizer 200.

In an embodiment, the vaporizer power supply 218 may be coupled to a power output port 220. The power output port 220 may comprise any type of output port capable of providing power (e.g., a charge) to another device. For example, the power output port 220 may comprise one or more of, a Universal Serial Bus (USB) port, a micro-USB port, a mini-USB port, a lightning port, a wireless (inductive and/or conductive) charging area, and the like. Another device, for example a smart phone, a music player, a laptop, any electronic device, and the like may connect to the power output port 220 to receive power for operation and/or for charging a battery. The vaporizer 200 may include a power output control component 240 for controlling and regulating the power to be provided an auxiliary electronic device connected to the power output port 220. In another embodiment, the power output control component 140 of the electronic vaporizing device 100 regulates the power to be provided to the vaporizer 200 and to an auxiliary electronic device connected to the power output port 220.

In another embodiment, the vaporizer 200 may comprise a piezoelectric dispersing element 242. In some embodiments, the piezoelectric dispersing element 242 may be charged by a battery, and may be driven by a processor on a circuit board. The circuit board may be produced using a polyimide such as Kapton®, or other suitable material. The piezoelectric dispersing element 242 may comprise a thin metal disc which causes dispersion of the fluid fed into the dispersing element via the wick or other soaked piece of organic material through vibration. Once in contact with the piezoelectric dispersing element 242, the vaporizable material (e.g., fluid) may be vaporized (e.g., turned into vapor or mist) and the vapor may be dispersed via a system pump and/or a sucking action of the user. In some embodiments, the piezoelectric dispersing element 242 may cause dispersion of the vaporizable material by producing ultrasonic vibrations. An electric field applied to a piezoelectric material within the piezoelectric dispersing element 242 may cause ultrasonic expansion and contraction of the piezoelectric material, resulting in ultrasonic vibrations to the disc. The ultrasonic vibrations may cause the vaporizable material to disperse, thus forming a vapor or mist from the vaporizable material.

In an embodiment, the vaporizer 200 may be configured to permit a user to select between using the heating element 214 or the piezoelectric dispersing element 242. In another embodiment, the vaporizer 200 may be configured to permit a user to utilize both the heating element 214 and the piezoelectric dispersing element 242.

In some embodiments, the connection between a power supply and the piezoelectric dispersing element 242 may be facilitated using one or more conductive coils. The conductive coils may provide an ultrasonic power input to the piezoelectric dispersing element 242. For example, the signal carried by the coil may have a frequency of approximately 107.8 kHz. In some embodiments, the piezoelectric dispersing element 242 may comprise a piezoelectric dispersing element that may receive the ultrasonic signal transmitted from the power supply through the coils, and may cause vaporization of the vaporizable liquid by producing ultrasonic vibrations. An ultrasonic electric field applied to a piezoelectric material within the piezoelectric element causes ultrasonic expansion and contraction of the piezoelectric material, resulting in ultrasonic vibrations according to the frequency of the signal. The vaporizable liquid may be vibrated by the ultrasonic energy produced by the piezoelectric dispersing element 242, thus causing dispersal and/or atomization of the liquid.

Figure 3:
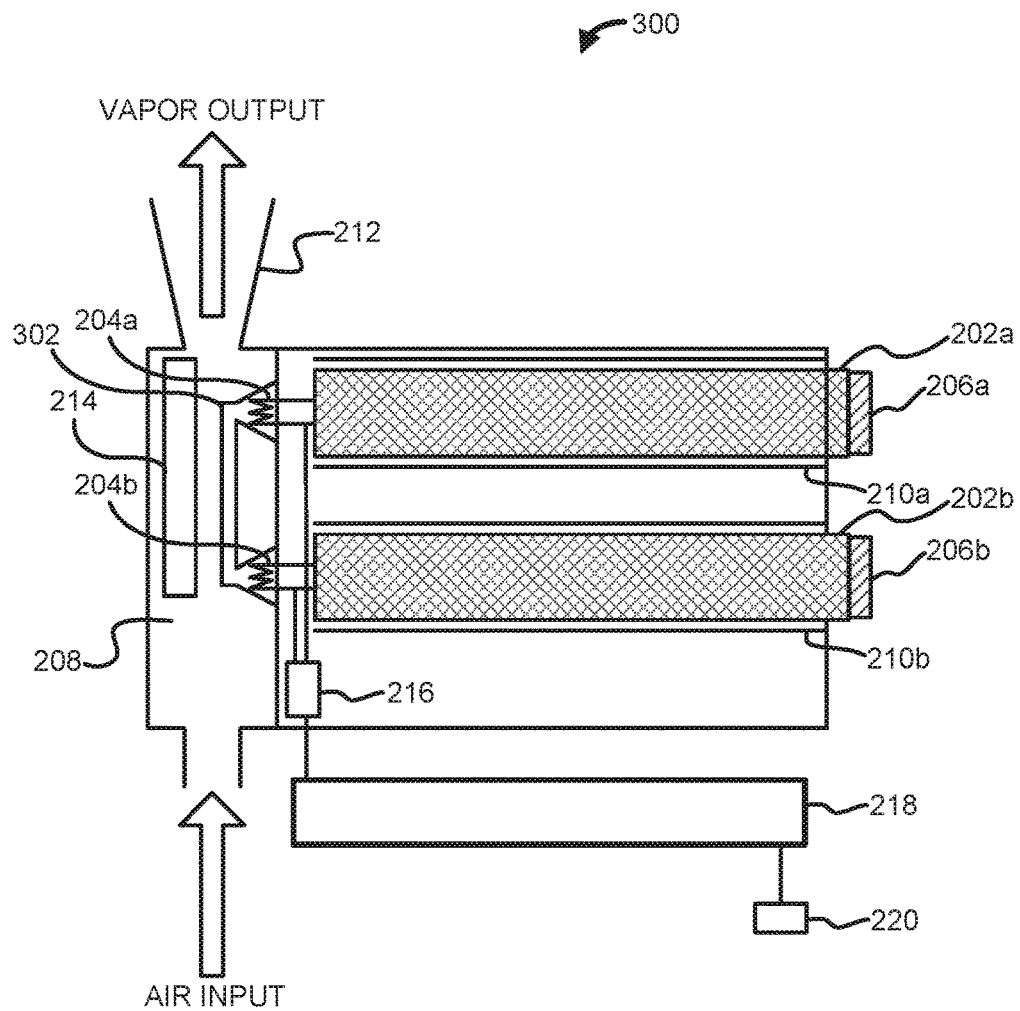
FIG. 3 is a diagram of one embodiment of an electronic vaporizing device configured for vaporizing a mixture of vaporizable material according to some embodiments.

FIG. 3 illustrates one embodiment of a vaporizer 300 that comprises the elements of the vaporizer 200 with two containers 202a and 202b containing a vaporizable material, for example a fluid. In an embodiment, the fluid may be the same fluid in both containers or the fluid may be different in each container. In an embodiment, the fluid may comprise aromatic elements. The aromatic element may include, but is not limited to, at least one of lavender or other floral aromatic eLiquids, mint, menthol, herbal soil or geologic, plant based, name brand perfumes, custom mixed perfume formulated inside the electronic vaporizing device 100 and aromas constructed to replicate the smell of different geographic places, conditions, and/or occurrences. For example, the smell of places may include specific or general sports venues, well known travel destinations, the mix of one's own personal space or home. The smell of conditions may include, for example, the smell of a pet, a baby, a season, a general environment (e.g., a forest), a new car, a sexual nature (e.g., musk, pheromones, etc.). Coupling between the vaporizer 200 and the container 202a and the container 202b may be via a wick 204a and a wick 204b, respectively, via a valve, or by some other structure. Coupling may operate independently of gravity, such as by capillary action or pressure drop through a valve. The vaporizer 300 may be configured to mix in varying proportions the fluids contained in the container 202a and the container 202b and vaporize the mixture at controlled rates in response to mechanical input from a component of the electronic vaporizing device 100, and/or in response to control signals from the processor 102 or another component. In an embodiment, a mixing element 302 may be coupled to the container 202a and the container 202b. The mixing element may, in response to a control signal from the processor 102, withdraw select quantities of vaporizable material to create a customized mixture of different types of vaporizable material. Vaporizable material (e.g., fluid) may be supplied by one or more replaceable cartridges 206a and 206b. The one or more replaceable cartridges 206a and 206b may contain a vaporizable material. If the vaporizable material is liquid, the cartridge may comprise the wick 204a or 204b to aid in transporting the liquid to a mixing chamber 208. In the alternative, some other transport mode may be used. Each of the one or more replaceable cartridges 206a and 206b may be configured to fit inside and engage removably with a receptacle (such as the container 202a or the container 202b and/or a secondary container) of the electronic vaporizing device 100. In an alternative, or in addition, one or more fluid containers 210a and 210b may be fixed in the electronic vaporizing device 100 and configured to be refillable. In an embodiment, one or more materials may be vaporized at a single time by the vaporizer 300. For example, some material may be vaporized and drawn through an exhaust port 212 and/or some material may be vaporized and exhausted via a smoke simulator outlet (not shown).

Figure 4:
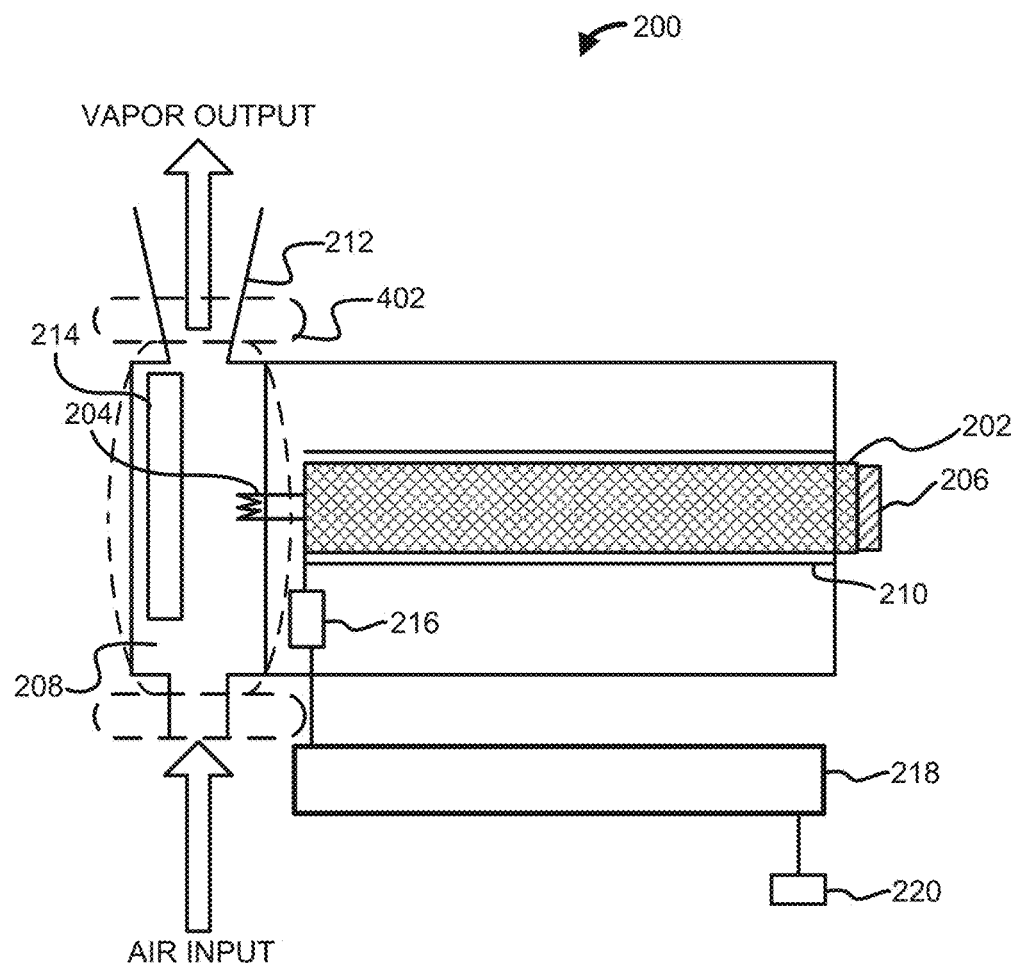
FIG. 4 is a diagram of one embodiment of an electronic vaporizing device configured for smooth vapor delivery according to some embodiments.

FIG. 4 illustrates one embodiment of a vaporizer 200 that comprises the elements of the vaporizer 200 with a heating casing 402. The heating casing 402 may enclose the heating element 214 or may be adjacent to the heating element 214. The heating casing 402 is illustrated with dashed lines, indicating components contained therein. The heating casing 402 may preferably be made of ceramic, metal, and/or porcelain. The heating casing 402 may have varying thickness. In an embodiment, the heating casing 402 may be coupled to the multiplexer 216 to receive power to heat the heating casing 402. In another embodiment, the heating casing 402 may be coupled to the heating element 214 to heat the heating casing 402. In another embodiment, the heating casing 402 may serve as an insulator.

Figure 5:
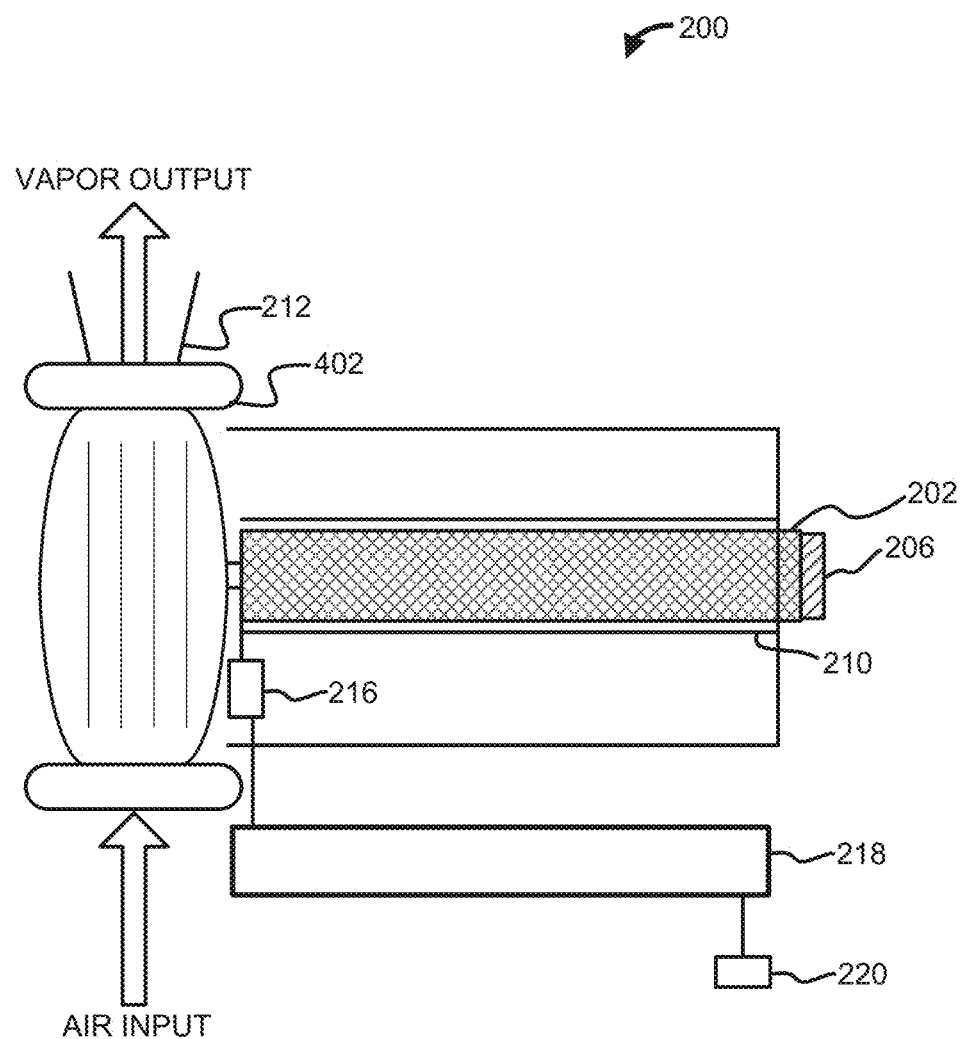
FIG. 5 is a diagram of one embodiment of an electronic vaporizing device configured for smooth vapor delivery according to some embodiments.

FIG. 5 illustrates one embodiment of the vaporizer 200 of FIG. 4, but illustrates the heating casing 402 with solid lines, indicating components contained therein. Other placements of the heating casing 402 are contemplated. For example, the heating casing 402 may be placed after the heating element 214 and/or the mixing chamber 208.

Figure 6:
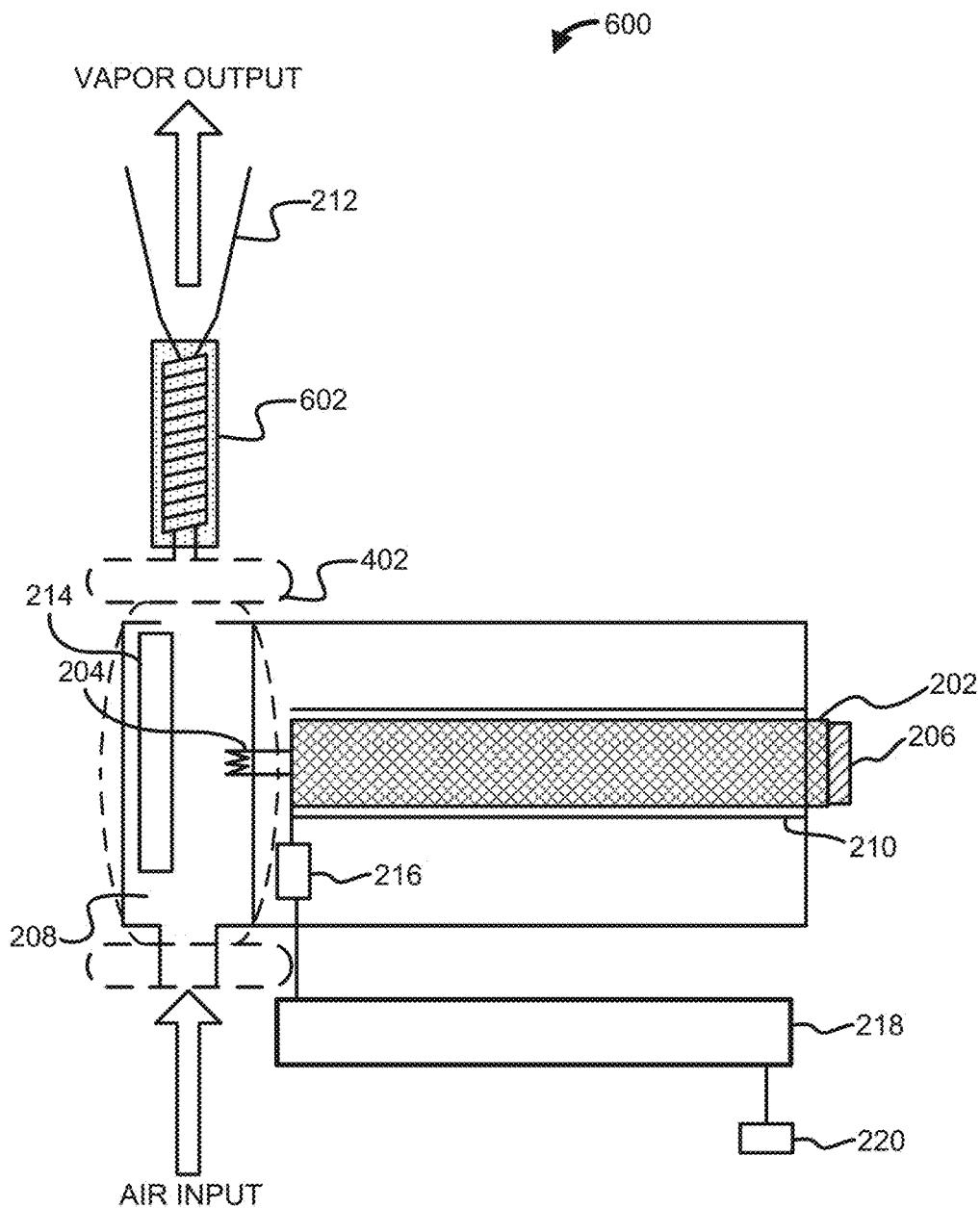
FIG. 6 is a diagram of one embodiment of an electronic vaporizing device configured for smooth vapor delivery according to some embodiments.

FIG. 6 illustrates one embodiment of a vaporizer 600 that comprises the elements of the vaporizer 200 of FIG. 2 and FIG. 4, with the addition of a cooling element 602. The vaporizer 600 may optionally comprise the heating casing 402. The cooling element 602 may comprise one or more of a powered cooling element, a cooling air system, and/or or a cooling fluid system. The cooling element 602 may be self-powered, co-powered, or directly powered by a battery and/or charging system within the electronic vaporizing device 100 (e.g., the power supply 120b). In an embodiment, the cooling element 602 may comprise an electrically connected conductive coil, grating, and/or other design to efficiently distribute cooling to the vaporized and/or non-vaporized air. For example, the cooling element 602 may be configured to cool air as it is brought into the vaporizer 600/mixing chamber 208 and/or to cool vapor after it exits the mixing chamber 208. The cooling element 602 may be deployed such that the cooling element 602 is surrounded by the heated casing 402 and/or the heating element 214. In another embodiment, the heated casing 402 and/or the heating element 214 may be surrounded by the cooling element 602. The cooling element 602 may utilize at least one of cooled air, cooled liquid, and/or cooled matter.

In an embodiment, the cooling element 602 may be a coil of any suitable length and may reside proximate to the inhalation point of the vapor (e.g., the exhaust port 212). The temperature of the air is reduced as it travels through the cooling element 602. In an embodiment, the cooling element 602 may comprise any structure that accomplishes a cooling effect. For example, the cooling element 602 may be replaced with a screen with a mesh or grid-like structure, a conical structure, and/or a series of cooling airlocks, either stationary or opening, in a periscopic/telescopic manner. The cooling element 602 may be any shape and/or may take multiple forms capable of cooling heated air, which passes through its space.

In an embodiment, the cooling element 602 may be any suitable cooling system for use in a vapor device. For example, a fan, a heat sink, a liquid cooling system, a chemical cooling system, combinations thereof, and the like. In an embodiment, the cooling element 602 may comprise a liquid cooling system whereby a fluid (e.g., water, coolant) passes through pipes in the vaporizer 600. As this fluid passes around the cooling element 602, the fluid absorbs heat, cooling the air in the cooling element 602. After the fluid absorbs the heat, the fluid may pass through a heat exchanger which transfers the heat from the fluid to air blowing through the heat exchanger. By way of further example, the cooling element 602 may comprise a chemical cooling system that utilizes an endothermic reaction. An example of an endothermic reaction is dissolving ammonium nitrate in water. Such endothermic process is used in instant cold packs. These cold packs have a strong outer plastic layer that holds a bag of water and a chemical, or mixture of chemicals, that result in an endothermic reaction when dissolved in water. When the cold pack is squeezed, the inner bag of water breaks and the water mixes with the chemicals. The cold pack starts to cool as soon as the inner bag is broken, and stays cold for over an hour. Many instant cold packs contain ammonium nitrate. When ammonium nitrate is dissolved in water, it splits into positive ammonium ions and negative nitrate ions. In the process of dissolving, the water molecules contribute energy, and as a result, the water cools down. Thus, the vaporizer 600 may comprise a chamber for receiving the cooling element 602 in the form of a "cold pack." The cold pack may be activated prior to insertion into the vaporizer 600 or may be activated after insertion through use of a button/switch and the like to mechanically activate the cold pack inside the vaporizer 600.

In an embodiment, the cooling element 602 may be selectively moved within the vaporizer 600 to control the temperature of the air mixing with vapor. For example, the cooling element 602 may be moved closer to the exhaust port 212 or further from the exhaust port 212 to regulate temperature. In another embodiment, insulation may be incorporated as needed to maintain the integrity of heating and cooling, as well as absorbing any unwanted condensation due to internal or external conditions, or a combination thereof. The insulation may also be selectively moved within the vaporizer 600 to control the temperature of the air mixing with vapor. For example, the insulation may be moved to cover a portion, none, or all of the cooling element 602 to regulate temperature.

Figure 7:
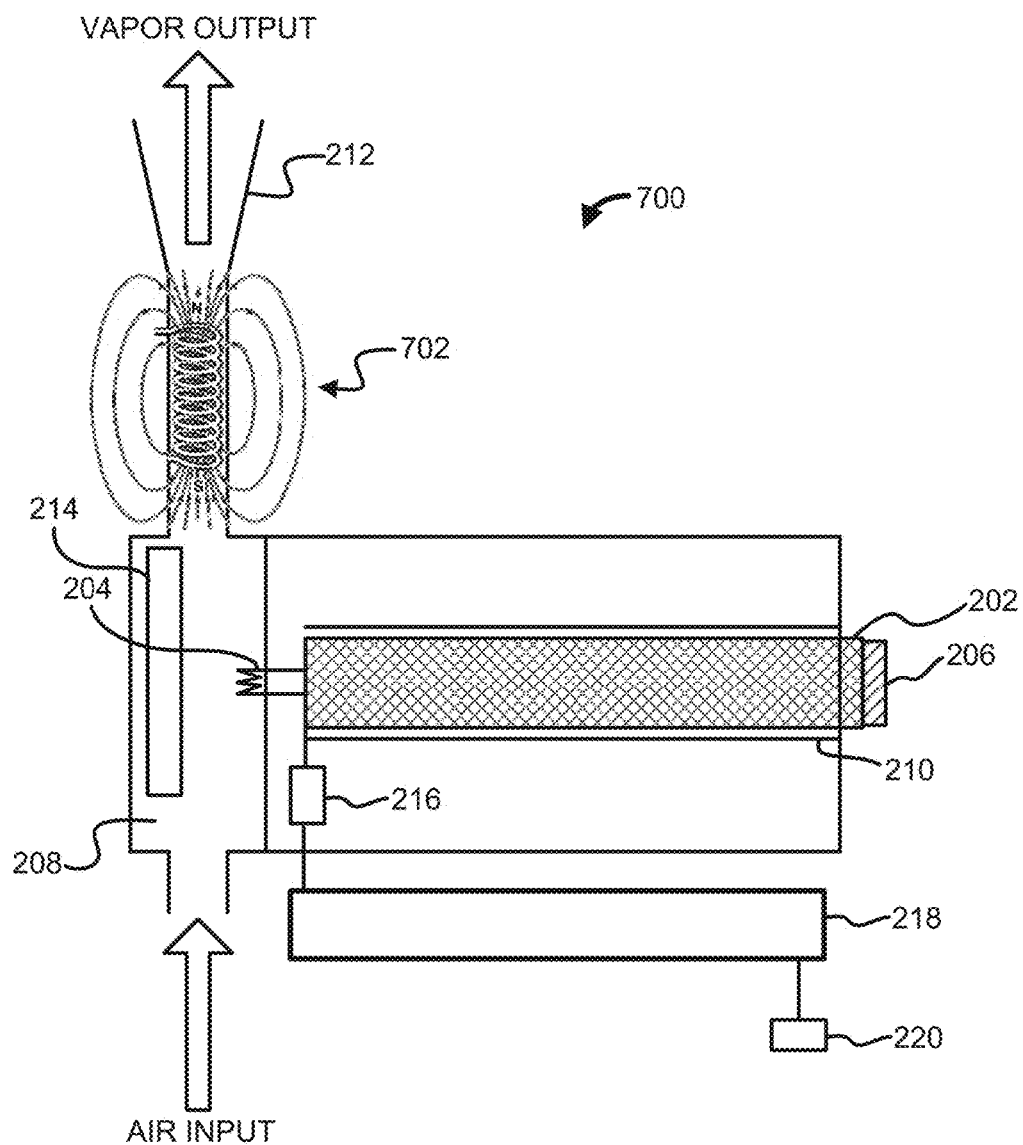
FIG. 7 is a diagram of one embodiment of an electronic vaporizing device configured for smooth vapor delivery according to some embodiments.

FIG. 7 illustrates one embodiment of a vaporizer 700 that comprises elements in common with the vaporizer 200. The vaporizer 700 may optionally comprise a heating casing (not shown) and/or a cooling element (not shown) as discussed above. The vaporizer 700 may comprise a magnetic element 702. The magnetic element 702 may apply a magnetic field to vapor after exiting the mixing chamber 208. The magnetic field may cause positively and negatively charged particles in the vapor to curve in opposite directions, according to the Lorentz force law with two particles of opposite charge. The magnetic field may be created by at least one of an electric current generating a charge or a pre-charged magnetic material deployed within the electronic vaporizing device 100. In an embodiment, the magnetic element 702 may be built into the mixing chamber 208, the cooling element 602, the heating casing 402, or may be a separate magnetic element 702.

Figure 8:
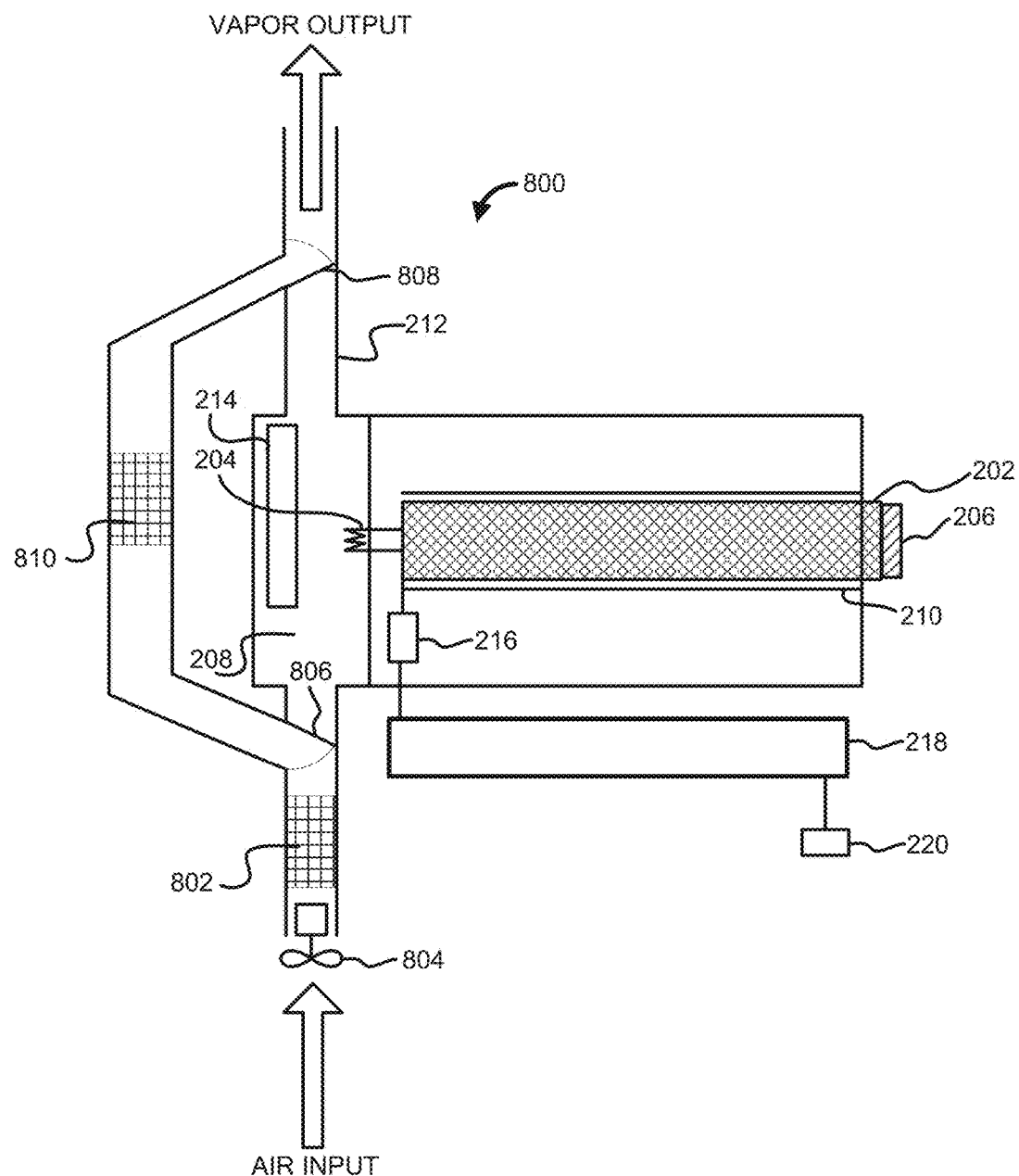
FIG. 8 is a diagram of one embodiment of an electronic vaporizing device configured for filtering air according to some embodiments.

FIG. 8 illustrates one embodiment of a vaporizer 800 that comprises elements in common with the vaporizer 200. In an embodiment, the vaporizer 800 may comprise a filtration element 802. The filtration element 802 may be configured to remove (e.g., filter, purify, etc.) contaminants from air entering the vaporizer 800. The filtration element 802 may optionally comprise a fan 804 to assist in delivering air to the filtration element 802. The vaporizer 800 may be configured to intake air into the filtration element 802, filter the air, and pass the filtered air to the mixing chamber 208 for use in vaporizing the one or more vaporizable or non-vaporizable materials. In another embodiment, the vaporizer 800 may be configured to intake air into the filtration element 802, filter the air, and bypass the mixing chamber 208 by engaging a door 806 and a door 808 to pass the filtered air directly to the exhaust port 212 for inhalation by a user. In an embodiment, filtered air that bypasses the mixing chamber 208 by engaging the door 806 and the door 808 may pass through a second filtration element 810 to further remove (e.g., filter, purify, etc.) contaminants from air entering the vaporizer 800. In an embodiment, the vaporizer 800 may be configured to deploy and/or mix a proper/safe amount of oxygen which may be delivered either via the one or more replaceable cartridges 206 or via air pumped into a mask from external air and filtered through the filtration element 802 and/or the filtration element 810.

In an embodiment, the filtration element 802 and/or the filtration element 810 may comprise cotton, polymer, wool, satin, meta materials and the like. The filtration element 802 and/or the filtration element 810 may comprise a filter material that at least one airborne particle and/or undesired gas by a mechanical mechanism, an electrical mechanism, and/or a chemical mechanism. The filter material may comprise one or more pieces of, a filter fabric that may filter out one or more airborne particles and/or gasses. The filter fabric may be a woven and/or non-woven material. The filter fabric may be made from natural fibers (e.g., cotton, wool, etc.) and/or from synthetic fibers (e.g., polyester, nylon, polypropylene, etc.). The thickness of the filter fabric may be varied depending on the desired filter efficiencies and/or the region of the apparel where the filter fabric is to be used. The filter fabric may be designed to filter airborne particles and/or gasses by mechanical mechanisms (e.g., weave density), by electrical mechanisms (e.g., charged fibers, charged metals, etc.), and/or by chemical mechanisms (e.g., absorptive charcoal particles, adsorptive materials, etc.). In as embodiment, the filter material may comprise electrically charged fibers such as, but not limited to, Filtrete® by 3M. In another embodiment, the filter material may comprise a high-density material similar to material used for medical masks which are used by medical personnel in doctors' offices, hospitals, and the like. In an embodiment, the filter material may be treated with an anti-bacterial solution and/or otherwise made from anti-bacterial materials. In another embodiment, the filtration element 802 and/or the filtration element 810 may comprise electrostatic plates, ultraviolet light, a HEPA filter, combinations thereof, and the like.

Figure 9:
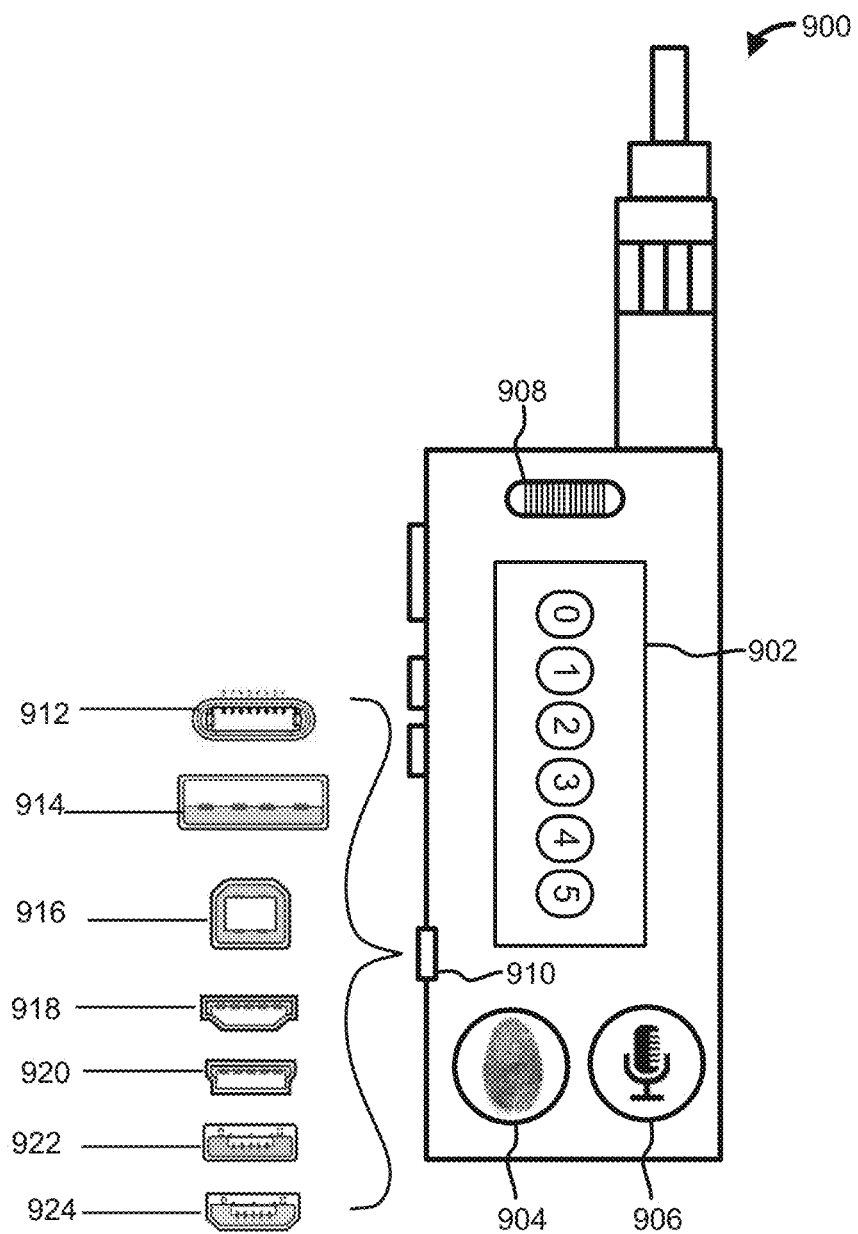
FIG. 9 illustrates one embodiment of an interface for an electronic vaporizing device configured for filtering air according to some embodiments.

FIG. 9 illustrates one embodiment of a vapor device 900. The exemplary vapor device 900 may comprise the electronic vaporizing device 100 and/or any of the vaporizers 200, 600, 700, 800 disclosed herein. The vapor device 900 illustrates a display 902. The display 902 may be a touchscreen. The display 902 may be configured to enable a user to control any and/or all functionality of the vapor device 900. For example, a user may utilize the display 902 to enter a pass code to lock and/or unlock the vapor device 900. The vapor device 900 may comprise a biometric interface 904. For example, the biometric interface 904 may comprise a fingerprint scanner, an eye scanner, a facial scanner, and the like. The biometric interface 904 may be configured to enable a user to control any and/or all functionality of the vapor device 900. The vapor device 900 may comprise an audio interface 906. The audio interface 906 may comprise a button that, when engaged, enables a microphone 908. The microphone 908 may receive audio signals and provide the audio signals to a processor for interpretation into one or more commands to control one or more functions of the vapor device 900.

The exemplary vapor device 900 may comprise one or more power output ports 910. The one or more power output ports 910 may comprise any type of output port capable of providing power (e.g., a charge) to another device. For example, the power output port 910 may comprise one or more of, a lightning port 912, Universal Serial Bus (USB) Type-A port 914, a USB Type-B port 916, a mini-USB Type-A port 918, a mini-USB Type-B port 920, a micro-USB Type-A port 922, a micro-USB Type-B port 924, a wireless inductive charging area, and a wireless conductive charging area, and the like. Another device, for example a smart phone, a music player, a laptop, any electronic device, and the like may connect to the power output port 910 to receive power for operation and/or for charging a battery. The vaporizer 900 may include a power output control component 940 for controlling and regulating the power to be provided an auxiliary electronic device connected to the power output port 910. In another embodiment, the power output control component 140 of the electronic vaporizing device 100 regulates the power to be provided to the vaporizer 900 and to an auxiliary electronic device connected to the power output port 910.

Figure 10:
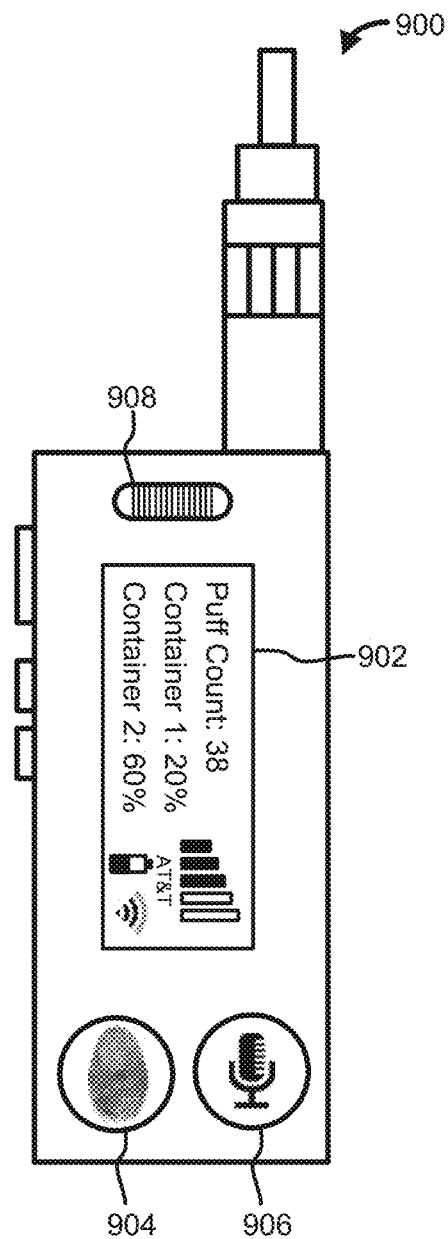
FIG. 10 illustrates one embodiment of an interface for an electronic vaporizing device configured for filtering air according to some embodiments.

FIG. 10 illustrates one embodiment of exemplary information that may be provided to a user via the display 902 of the vapor device 900. The display 902 may provide information to a user such as a puff count, an amount of vaporizable material remaining in one or more containers, power remaining in one or more power supplied, signal strength, combinations thereof, and the like. The display 902 is preferably digital, but may be analog.

In an embodiment, illustrated in FIG. 11A, FIG. 11B, and FIG. 11C, provided is one embodiment of a hybrid electronic communication vapor device 1100. As shown in FIG. 11A, the hybrid electronic communication vapor device 1100 may comprise a smartphone 1101 (or other type of personal computing device) and a detachable vaporizer 1102. The smartphone 1101 and the detachable vaporizer 1102 may connect via an input/output port 1103 on the smartphone 1101 and an input/output port 1104 on the detachable vaporizer 1102. The input/output port 1103 and the input/output port 1104 may adhere to any proprietary standard created by a manufacturer. In another embodiment, the input/output port 1103 and the input/output port 1104 may comprise one or more of, a USB connection, a dock connector (e.g., 20-24-30 pin connectors, lightning port connection, etc.), Portable Digital Media Interface, and the like. The input/output port 1103 and the input/output port 1104 may be used to pass power and/or data between the smartphone 1101 and the detachable vaporizer 1102. The detachable vaporizer 1102 may further comprise a power output port 1114. The power output port 1114 may comprise any type of output port capable of providing power (e.g., a charge) to another device. For example, the power output port 1114 may comprise one or more of, a Universal Serial Bus (USB) port, a micro-USB port, a mini-USB port, a lightning port, a wireless (inductive and/or conductive) charging area, and the like. Another device, for example a smart phone, a music player, a laptop, any electronic device, and the like may connect to the power output port 1114 to receive power for operation and/or for charging a battery. The hybrid electronic communication vapor device 1100 may comprise a power output control component 1140 for controlling and regulating the power to be provided an auxiliary electronic device connected to the power output port 1114.

The detachable vaporizer 1102 may comprise a vaporize button 1105 that may be configured to initiate a process of vaporizing a vaporizable material contained within the detachable vaporizer 1102, resulting in vapor exiting an exhaust port 1106 for inhalation by a user. The exhaust port 1106 may be hingedly attached to the detachable vaporizer 1102 to enable the exhaust port 1106 to be stored within a housing of the detachable vaporizer 1102. The detachable vaporizer 1102 may comprise an exhaust port release button 1107 to disengage the exhaust port 1106 when stored and locked within the housing of the detachable vaporizer 1102.

FIG. 11B illustrates the hybrid electronic communication vapor device 1100 after the smartphone 1101 and the detachable vaporizer 1102 have been coupled via the input/output port 1103 and the input/output port 1104.

FIG. 11C illustrates the detachable vaporizer 1102. In one embodiment, the detachable vaporizer 1102 may substantially comprise the vaporizer 200 illustrated in FIG. 2. The detachable vaporizer 1102 may receive air through an input/output port 1108. The received air may pass into a mixing chamber 1109. The detachable vaporizer 1102 may comprise or be coupled to one or more containers 1110 containing a vaporizable material, for example a fluid. A wick 1111, or a valve, may couple the one or more containers 1110 to the mixing chamber 1109. Coupling may operate independently of gravity, such as by capillary action or pressure drop through a valve. The detachable vaporizer 1102 may be configured to vaporize the vaporizable material from the one or more containers 1110 at controlled rates in response to mechanical input from the vaporize button 1105 and/or in response to control signals from the smartphone 1101 or another component. Vaporizable material (e.g., fluid) may be supplied by one or more replaceable cartridges. The one or more replaceable cartridges may contain a vaporizable material. If the vaporizable material is liquid, the cartridge may comprise the wick 1111 to aid in transporting the liquid to a mixing chamber 1109. In the alternative, some other transport mode may be used. In an embodiment, one or more materials may be vaporized at a single time by the detachable vaporizer 1102.

In operation, a heating element 1112 may vaporize or nebulize the vaporizable material in the mixing chamber 1109, producing an inhalable vapor/mist that may be expelled via the exhaust port 1106. In an embodiment, the heating element 1112 may be coupled to the wick (or a heated wick) 1111 and operatively coupled to (for example, in fluid communication with) the mixing chamber 1109. The heating element 1112 may comprise a nickel-chromium wire or the like, with a temperature sensor (not shown) such as a thermistor or thermocouple. Within definable limits, by controlling power to the wick 1111, a rate of vaporization may be independently controlled. The heating element 1112 may receive power through the input/output port 1103 and the input/output port 1104. For example, the heating element 1112 may receive power from a power supply built into the smartphone 1101 and/or a power supply 1113. The power supply 1113 may comprise a lithium-ion battery (including thin film lithium ion batteries), a lithium ion polymer battery, a nickel-cadmium battery, a nickel metal hydride battery, a lead-acid battery, combinations thereof, and the like.

The power supply 1113 may be configured for one or more of, wireless charging (e.g., inductive and/or conductive), supplying a constant DC or pulsed DC power source to a battery being charged, a motion-powered charger, a pulse charger, a solar charger, a wind charger, a Universal Serial Bus (USB) charger, and combinations thereof. The power supply 1113 may be coupled to the power output port 1114 to provide power to a device coupled to the power output port 1114. The hybrid electronic communication vapor device 1100 may comprise a power output control component 1140 for controlling and regulating the power to be provided an auxiliary electronic device connected to the power output port 1114.

The heating element 1112 may vaporize or nebulize the vaporizable material in the mixing chamber 1109. The detachable vaporizer 1102 may exchange data signals and/or power with the smartphone 1101 through the input/output port 1103 and the input/output port 1104 for control of the detachable vaporizer 1102.

Figure 12C:
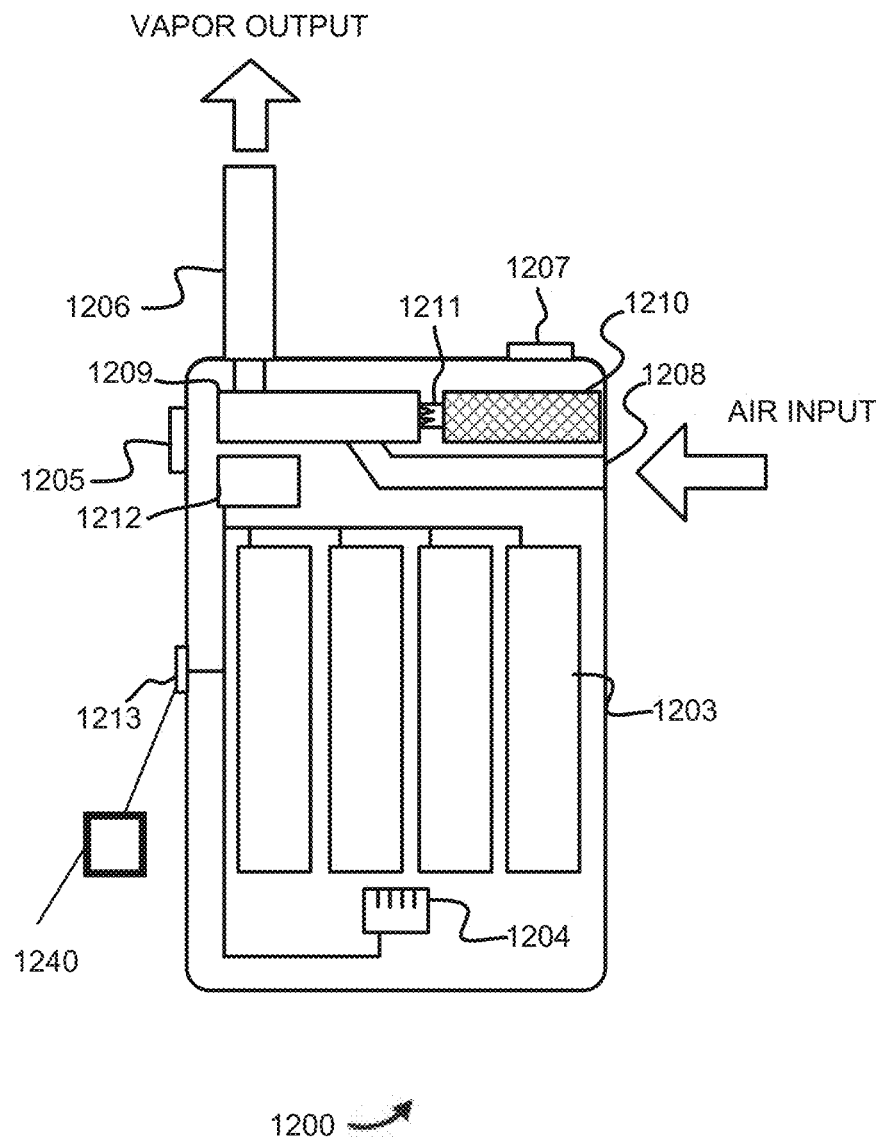
FIG. 12c is a diagram of one embodiment of a detachable vaporizing device according to some embodiments.

In an embodiment, illustrated in FIG. 12A, FIG. 12B, and FIG. 12C, is an example hybrid electronic communication vapor device 1200. As shown in FIG. 12A, the hybrid electronic communication vapor device 1200 may comprise a smartphone 1201 (or other personal computing device) and a detachable vaporizer 1202. The detachable vaporizer 1202 may comprise a vaporize button 1205 that may be configured to initiate a process of vaporizing a vaporizable material contained within the detachable vaporizer 1202, resulting in vapor exiting an exhaust port 1206 for inhalation by a user. The exhaust port 1206 may be hingedly (or removeably, telescopically, etc.) attached to the detachable vaporizer 1202 to enable the exhaust port 1206 to be stored within a housing of the detachable vaporizer 1202. The detachable vaporizer 1202 may comprise an exhaust port release button 1207 to disengage the exhaust port 1206 when stored and locked within the housing of the detachable vaporizer 1202.

The detachable vaporizer 1202 may further comprise a power output port 1213. The power output port 1213 may comprise any type of output port capable of providing power (e.g., a charge) to another device. For example, the power output port 1213 may comprise one or more of, a Universal Serial Bus (USB) port, a micro-USB port, a mini-USB port, a lightning port, a wireless (inductive and/or conductive) charging area, and the like. Another device, for example a smart phone, a music player, a laptop, any electronic device, and the like may connect to the power output port 1213 to receive power for operation and/or for charging a battery. The hybrid electronic communication vapor device 1200 may comprise a power output control component 1240 for controlling and regulating the power to be provided an auxiliary electronic device connected to the power output port 1213.

FIG. 12B illustrates one embodiment of the detachable vaporizer 1202 without being coupled to the smartphone 1201. The detachable vaporizer 1202 may comprise an input/output port 1204. The input/output port 1204 may couple to the input/output port (not shown) of the smartphone 1201. The input/output port of the smartphone and the input/output port 1204 may adhere to any proprietary standard created by a manufacturer. In another embodiment, the input/output port of the smartphone and the input/output port 1204 may comprise one or more of, a USB connection, a dock connector (e.g., 20-24-30 pin connectors, lightning port connection, etc.), Portable Digital Media Interface, and the like. The input/output port of the smartphone and the input/output port 1204 may be used to pass power and/or data between the smartphone 1201 and the detachable vaporizer 1202.

FIG. 12C illustrates one embodiment of the detachable vaporizer 1202. In an embodiment, the detachable vaporizer 1202 may comprise the vaporizer 200 illustrated in FIG. 2. The detachable vaporizer 1202 may receive air through an input/output port 1208. The received air may pass into a mixing chamber 1209. The detachable vaporizer 1202 may comprise or be coupled to one or more containers 1210 containing a vaporizable material, for example a fluid. A wick 1211, or a valve, may couple the one or more containers 1210 to the mixing chamber 1209. Coupling may operate independently of gravity, such as by capillary action or pressure drop through a valve. The detachable vaporizer 1202 may be configured to vaporize the vaporizable material from the one or more containers 1210 at controlled rates in response to mechanical input from the vaporize button 1205 and/or in response to control signals from the smartphone 1201 or another component. Vaporizable material (e.g., fluid) may be supplied by one or more replaceable cartridges. The one or more replaceable cartridges may contain a vaporizable material. If the vaporizable material is liquid, the cartridge may comprise the wick 1211 to aid in transporting the liquid to a mixing chamber 1209. In the alternative, some other transport mode may be used. In an embodiment, one or more materials may be vaporized at a single time by the detachable vaporizer 1202.

In operation, a heating element 1212 may vaporize or nebulize the vaporizable material in the mixing chamber 1209, producing an inhalable vapor/mist that may be expelled via the exhaust port 1206. In an embodiment, the heating element 1212 may be coupled to the wick (or a heated wick) 1211 and operatively coupled to (for example, in fluid communication with) the mixing chamber 1209. The heating element 1212 may comprise a nickel-chromium wire or the like, with a temperature sensor (not shown) such as a thermistor or thermocouple. Within definable limits, by controlling power to the wick 1211, a rate of vaporization may be independently controlled. In an embodiment, the heating element 1212 may receive power through the input/output port 1204. For example, the heating element 1212 may receive power from a power supply built into the smartphone 1201. In another embodiment, the heating element 1212 may receive power through one or more batteries 1203. The one or more batteries may be rechargeable. The one or more batteries may comprise a lithium-ion battery (including thin film lithium ion batteries), a lithium ion polymer battery, a nickel-cadmium battery, a nickel metal hydride battery, a lead-acid battery, combinations thereof, and the like.

As discussed above, the hybrid electronic communication vapor device 1200 may comprise a power output control component 1240 for controlling and regulating the power to be provided an auxiliary electronic device connected to the power output port 1213. In an embodiment, the one or more batteries 1203 may exclusively provide power to the detachable vaporizer 1202 and/or may be configured to provide power to both the detachable vaporizer 1202 and the smartphone 1201. In an embodiment, the one or more batteries 1203 may provide backup power for the smartphone 1201. In another embodiment, the one or more batteries 1203 may charge one or more batteries internal to the smartphone 1201. In another embodiment, the one or more batteries 1203 may directly power the smartphone 1201. The one or more batteries 1203 may be coupled to the power output port 1213 to provide power to any device connected to the power output port 1213. The heating element 1207 may vaporize or nebulize the vaporizable material in the mixing chamber 1209. The detachable vaporizer 1202 may exchange data signals with a processor of the smartphone 1201 through the input/output port 1215 and the input/output port 1204 for control of the detachable vaporizer 1202.

The power source of the electronic vaporizing devices disclosed herein may be charged via at least one of kinetic movements, piezoelectric energy gathering temperature differential powering micro turbine. For example, a nonlinear piezoelectric rotary transducer may be utilized to enable a compact low speed wind generators. At smaller scales, piezoelectric transduction becomes more effective than electromagnetic transduction. Therefore, one way of realizing the compact wind turbine is by replacing the electromagnetic generator with a piezoelectric transducer. The rotation of the blades results in large oscillations of piezoelectric beams. The piezoelectric bimorphs are made bi-stable by incorporation of repelling magnetic force. The magnetic force is due to interaction of permanent magnets at the tip of the beams with permanent magnets rotating with the blades. Since the magnetic force changes with blade rotation, the dynamics of the beams changes in time and the system is thus parametrically excited. In one embodiment, an 80 mm×80 mm×175 mm nonlinear piezoelectric wind generator may generate milliwatts of power from wind as slow as 2 ms-1.

Figure 13:
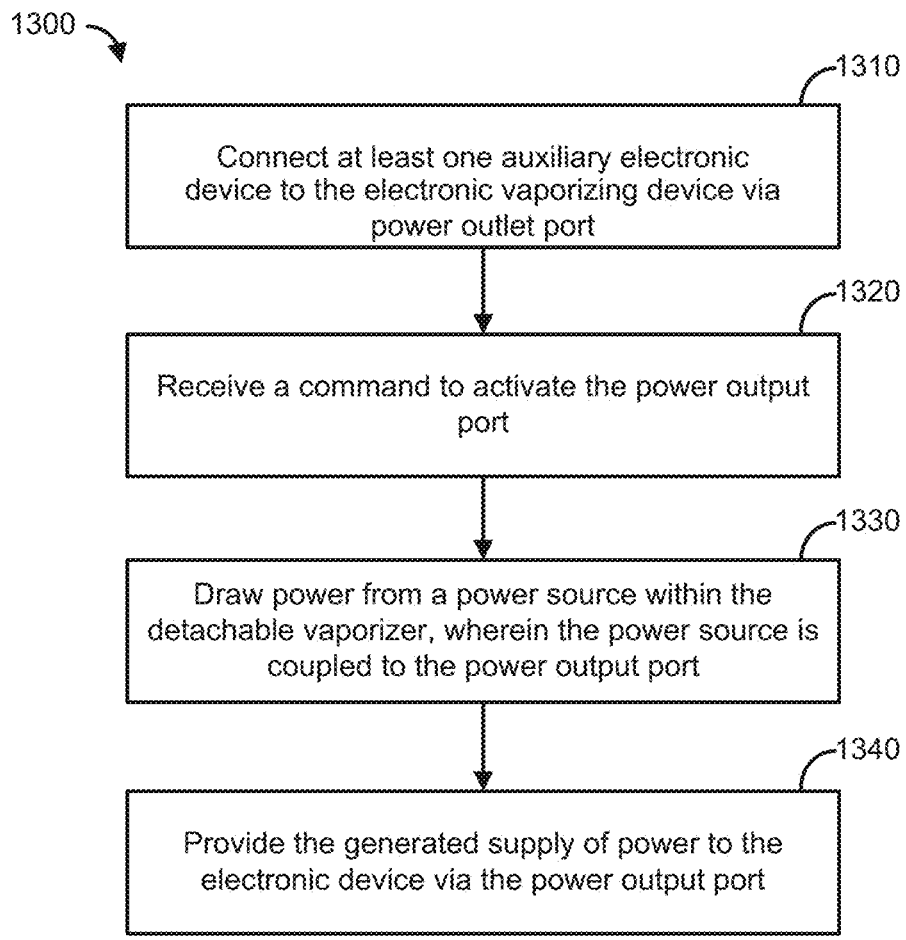
FIG. 13 is a flow block diagram of one embodiment of a method for provisioning power generated by at least one power source of an associated electronic vaporizing device according to some embodiments.

One embodiment, illustrated in FIG. 13, may be a method 1300 for provisioning a supply of power generated by at least one power source of the electronic vaporizing devices shown in FIGS. 1-12 and described above. The method may comprise 1310 connecting at least one auxiliary electronic device to the electronic vaporizing device 100 via the power outlet port 138.

The method 1300 may further comprise the step 1320 receiving command to activate the power output port, wherein the power output control component 140 obtains data relating to the operational parameters of the electronic vaporizing device 100, operational parameters of the at least one auxiliary electronic device, power generation parameters of the at least one power source, connection parameters, and preference parameters for the provision of power may be obtained by any suitable means. In a preferred embodiment, the power output control component 140 receives the power provision parameter data from an associated user, other computer system, device, network, or the like via the input/output interface 112, through the network access device 106, sensor 136, via a computer readable medium, or combinations thereof. For example, the operational parameters of the electronic vaporizing device 100 and the power generated by the at least one power source may be set during manufacturing and provided within the processor 102. The operational parameters of the at least one auxiliary electronic device may be transmitted from such device to the processor 102

In one embodiment, a user may input desired power provision parameters via a user interface associated with the input/output interface 112. The input/output interface 112 may include the functionality to allow an associated user to select parameters, features or other options for the provision of power between the electronic vaporizing device 100 and at least one auxiliary electronic device.

The method 1300 may further comprise the step 1330 drawing power from a power source within the detachable vaporizer, wherein the power source may be coupled to the power output port. The power output control component 140 may determine, in response to data obtained relating to at least one of operational parameters of the electronic vaporizing device 100, operational parameters of the at least one auxiliary electronic device, power generation parameters of the at least one power source, connection parameters, and preference parameters at least one power provision parameter.

The method 1300 further comprises the step 1340 providing the generated supply of power to the electronic device via the power output port. The power output control component 140 may be configured to regulate the generated supply of power provided to the electronic vaporizing device 100 and the at least one auxiliary electronic device in accordance with the at least one power provision parameter. Power then generated by the at least one power source will be provided to the electronic vaporizing device 100 and the at least one auxiliary electronic device in accordance with the at least one power provision parameter.

It is to be understood that the provisioning of power between the electronic vaporizing device 100 and the at least one auxiliary electronic device may be modified or adjusted in any manner or at any time as desired or required to meet new or changing power requirements. For example, the provisioning of power between the electronic vaporizing device 100 and the at least one auxiliary electronic device may change based on updated operational parameters for the electronic vaporizing device 100, an addition and/or change in an auxiliary electronic device connected to the electronic vaporizing device 100, new or updated power provision preference parameters, and the like.

In view of the exemplary systems described herein, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers.

Those of ordinary skill in the relevant art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

As used in this application, the terms "component," "module," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server may be a component. One or more components may reside within a process and/or thread of execution and a component may be localized on one computer and/or distributed between two or more computers.

As used herein, a "vapor" includes mixtures of a carrier gas or gaseous mixture (for example, air) with any one or more of a dissolved gas, suspended solid particles, or suspended liquid droplets, wherein a substantial fraction of the particles or droplets if present are characterized by an average diameter of not greater than three microns. As used herein, an "aerosol" has the same meaning as "vapor," except for requiring the presence of at least one of particles or droplets. A substantial fraction means 10% or greater; however, it should be appreciated that higher fractions of small (<3 micron) particles or droplets may be desirable, up to and including 100%. It should further be appreciated that, to simulate smoke, average particle or droplet size may be less than three microns, for example, may be less than one micron with particles or droplets distributed in the range of 0.01 to 1 micron. A vaporizer may include any device or assembly that produces a vapor or aerosol from a carrier gas or gaseous mixture and at least one vaporizable material. An aerosolizer is a species of vaporizer, and as such is included in the meaning of vaporizer as used herein, except where specifically disclaimed.

Various embodiments presented in terms of systems may comprise a number of components, modules, and the like. It is to be understood and appreciated that the various systems may include additional components, modules, etc. and/or may not include all of the components, modules, etc. discussed in connection with the figures. A combination of these approaches may also be used.

In addition, the various illustrative logical blocks, modules, and circuits described in connection with certain embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, system-on-a-chip, or state machine. A processor may also be implemented as a combination of computing devices, e.g., a combination of a DSP and a microprocessor, a plurality of microprocessors, one or more microprocessors in conjunction with a DSP core, or any other such configuration.

Operational embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, a DVD disk, or any other form of storage medium known in the art. An exemplary storage medium is coupled to the processor such the processor may read information from, and write information to, the storage medium. In the alternative, the storage medium may be integral to the processor. The processor and the storage medium may reside in an ASIC or may reside as discrete components in another device.

Furthermore, the one or more versions may be implemented as a method, apparatus, or article of manufacture using standard programming and/or engineering techniques to produce software, firmware, hardware, or any combination thereof to control a computer to implement the disclosed embodiments. Non-transitory computer readable media may include but are not limited to magnetic storage devices (e.g., hard disk, floppy disk, magnetic strips), optical disks (e.g., compact disk (CD), digital versatile disk (DVD)), smart cards, and flash memory devices (e.g., card, stick). Those skilled in the art will recognize many modifications may be made to this configuration without departing from the scope of the disclosed embodiments.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

Unless otherwise expressly stated, it is in no way intended that any method set forth herein be construed as requiring that its steps be performed in any specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those of ordinary skill in the art that various modifications and variations may be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. An electronic vaporizing device comprising:
a processor operable for controlling the electronic vaporizing device;
at least one container configured to store a vaporizable material;
a vaporizing component operatively coupled to the processor and controlled in part by the processor, wherein the vaporizing component is in fluid communication with the at least one container for receiving at least a portion of the vaporizable material therefrom, wherein the vaporizing component is operable to vaporize the vaporizable material received therein;
at least one vapor outlet coupled to the vaporizing component and configured to receive vapor generated by the vaporizing component, the at least one vapor outlet operable to expel the generated vapor from the vaporizing device;
at least one power source operatively coupled to the vaporizing component, wherein the at least one power source is operable to generate a supply of power for at least the operation of the vaporizing component;
at least one power output port operatively coupled to the at least one power source and configured to connect to at least one auxiliary electronic device, wherein the at least one power output port is operable to provide at least a portion of the supply of power generated by the at least one power source to the at least one auxiliary electronic device; and
a power output control component operatively coupled to the processor and controlled in part by the processor, wherein the power output control component is operatively coupled to the at least one power source and operable to regulate generated supply of power provided to the vaporizing component and at least one auxiliary electronic device connected to the power outlet port.

2. The electronic vaporizing device of claim 1, wherein the power output control component is operable to regulate the generated supply of power provided to the vaporizing component and at least one auxiliary electronic device connected to the at least one power outlet port such that the generated supply of power provided to the vaporizing component and the at least one auxiliary electronic device is in accordance with at least one power provision parameter.

3. The electronic vaporizing device of claim 2, wherein the processor is further operable to:
obtain data associated with at least one operational parameter of the vaporizing component, at least one operational parameter of the at least one auxiliary electronic device, at least one power generation parameter of the at least one power source, at least one connection parameter of a connection of the at least one auxiliary electronic device to the at least one power outlet port, at least one preference parameter for the provision of available supply of generated power to be provided to the vaporizing component and the at least one auxiliary electronic device, and combinations thereof;
determine, in response to at least a portion of the obtained data, at least one power provision parameter for the power output control component;
configure the at least one power provision parameter of the power output control component; and
regulate the generated supply of power provided to the vaporizing component and the at least one auxiliary electronic device in accordance with the at least one power provision parameter.

4. The electronic vaporizing device of claim 3, further comprising an input/output interface operatively coupled to the processor, and wherein the processor is further operable to receive preference parameter data for the provision of available supply of generated power from an associated user via the at least one input/output interface.

5. The electronic vaporizing device of claim 1, wherein at least one power source comprises at least one vaporizing component power source configured to generate a supply of power for the operation of the vaporizing component.

6. The electronic vaporizing device of claim 1, wherein the at least one power source comprises at least one auxiliary electronic device power source configured to generate a supply of power to be provided to at least one auxiliary electronic device connected to the at least one power output port.

7. The electronic vaporizing device of claim 1, wherein the at least one power source is selected from the group consisting of at least one of a battery source, a connection to an electrical power source, and combinations thereof.

8. The electronic vaporizing device of claim 7, wherein the at least one power source is selected from the group consisting of at least one battery selected from the group consisting of lithium-ion batteries, thin film lithium-ion batteries, lithium-ion polymer batteries, nickel-cadmium batteries, nickel metal hydride batteries, lead-acid batteries, and combinations thereof.

9. The electronic vaporizing device of claim 7, wherein the at least one power source comprises at least one rechargeable battery.

10. The electronic vaporizing device of claim 9, wherein the at least one rechargeable battery is operable to be recharged via at least one of a wireless charging source, a connection to an electrical power source, a motion-powered dynamo charging source, a pulse charging source, a solar charging source, a wind charging source, and combinations thereof.

11. The electronic vaporizing device of claim 1, wherein the at least one power output port is selected from the group consisting of a Universal Serial Bus (USB) port, a micro-USB port, a mini-USB port, a lightening port, a dock connector, a wireless charging area, and combinations thereof.

12. The electronic vaporizing device of claim 1, wherein the at least one power output port is configured to be connected to at least one electronic computing device selected from the group of electronic computing devices consisting of: a portable computing device, a smartphone, a mobile phone, a music player, and an electronic gaming device.

13. The electronic vaporizing device of claim 1, wherein the electronic vaporizing device is selected from the group of electronic vaporizing devices consisting of: an electronic cigarette, an electronic cigar, an electronic vapor device integrated with an electronic communication device, a robotic vapor device, and a micro-size electronic vapor device.

14. A method for provisioning power generated by at least one power source of an associated electronic vaporizing device, wherein the electronic vaporizing device comprises a vaporizing component operable to vaporize materials received therein and expel the generated vapor from the vaporizing device, at least one power source operatively coupled to the vaporizing component, at least one power output port operatively coupled to the at least one power source and configured to connect to at least one auxiliary electronic device, wherein the at least one power output port is operable to provide power generated by the at least one power source to the at least one auxiliary electronic device, and a power output control component operatively coupled to the at least one power source and operable to regulate a supply of power provided to the vaporizing component and at least one auxiliary electronic device connected to the power outlet port, the method comprising:
- generating the supply of power by the at least one power source;
- determining a provisioning of at least a portion of the generated supply of power between the vaporizing component and the at least one auxiliary electronic device, wherein such determination is in accordance with at least one power provision parameter; and
- providing at least a portion of the generated supply of power to the vaporizing component and at least one auxiliary electronic device connected to the at least one power outlet port in accordance with such determination.

15. The method of claim 14, further comprising:
- obtaining data associated with at least one operational parameter of the vaporizing component, at least one operational parameter of the at least one auxiliary electronic device, at least one power generation parameter of the at least one power source, at least one connection parameter of the connection of the at least one auxiliary electronic device to the at least one power outlet port, at least one preference parameter for the provision of available power to be provided to the vaporizing component and the at least one auxiliary electronic device, and combinations thereof;
- determining, in response to at least a portion of the obtained data, at least one power provision parameter for the power output control component;
- configuring the at least one power provision parameter of the power output control component; and
- regulating the generated supply of power provided to the vaporizing component and the at least one auxiliary electronic device in accordance with the at least one power provision parameter.

16. The method of claim 14, further comprising:
- receiving preference parameter data for the provision of available data from an associated user via the at least one input/output interface.

17. The method of claim 14, wherein the generated supply of power is generated by at least one of a battery source, a connection to an electrical power source, and combinations thereof.

18. The method of claim 14, wherein the generated supply of power provided to the at least one auxiliary electronic device is used for at least one of an operation of the at least one auxiliary electronic device, a charging a rechargeable power source of the at least one auxiliary electronic device, and combinations thereof.

19. A system for provisioning power between an electronic vaporizing device and at least one auxiliary electronic device comprising:
- the electronic vaporizing device comprising:
  - a first processor operable for controlling the electronic vaporizing device,
  - at least one container configured to store a vaporizable material,
  - a vaporizing component operatively coupled to the first processor and controlled in part by the first processor, wherein the vaporizing component is in fluid communication with the at least one container for receiving at least a portion of the vaporizable material therefrom, wherein the vaporizing component is operable to vaporize the vaporizable material received therein,
  - at least one vapor outlet coupled to the vaporizing component and configured to receive a vapor generated by the vaporizing component, the at least one vapor outlet operable to expel the generated vapor from the vaporizing device,
  - at least one vaporizing power source operatively coupled to the vaporizing component, wherein the at least one vaporizing power source is operable to generate a supply of power for at least the operation of the vaporizing component,
  - at least one power output port operatively coupled to the at least one vaporizing power source and configured to connect to at least one auxiliary electronic device, wherein the at least one power output port is operable to provide at least a portion of the generated supply of power generated by the at least one vaporizing power source to the at least one auxiliary electronic device, and
  - a power output control component operatively coupled to the first processor and controlled in part by the first processor, wherein the power output control component is operatively coupled to the at least one vaporizing power source and operable to regulate the generated supply of power provided to the vaporizing component and at least one auxiliary electronic device connected to the power outlet port; and
- an auxiliary electronic device comprising,
  - a second processor operable for controlling the auxiliary electronic device,
  - at least one auxiliary device power source operatively connected to the second processor and operable to generate a supply of auxiliary device power for operation of the auxiliary electronic device,
  - a power input port operatively connected to the at least one device power source and configured to connect with the power output port of the electronic vaporizing device, wherein the power input port is operable to receive at least a portion of the supply of power generated by the at least one vaporizing power source.

20. The system for provisioning power between an electronic vaporizing device and at least one auxiliary electronic device of claim 19, wherein the first processor is further operable to:
- obtain data associated with at least one operational parameter of the vaporizing component, at least one operational parameter of the at least one auxiliary electronic device, at least one power generation parameter of the at least one vaporizing power source, at least one connection parameter of a connection of the at least one auxiliary electronic device to the at least one power outlet port, at least one preference parameter for the provision of available power to be provided to the vaporizing component and the at least one auxiliary electronic device, and combinations thereof;
- determine, in response to at least a portion of the obtained data, at least one power provision parameter for the power output control component;
- configure the at least one power provision parameter of the power output control component; and
- regulate the supply of power generated by the vaporizing component and provided to the vaporizing component and the at least one auxiliary electronic device in accordance with the at least one power provision parameter.

\* \* \* \* \*